(12) United States Patent
Moshfeghi

(10) Patent No.: US 9,979,532 B2
(45) Date of Patent: *May 22, 2018

(54) METHOD AND SYSTEM FOR DISTRIBUTED COMMUNICATION

(71) Applicant: Golba LLC, Rancho Palos Verdes, CA (US)

(72) Inventor: Mehran Moshfeghi, Rancho Palos Verdes, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/017,669

(22) Filed: Feb. 7, 2016

(65) Prior Publication Data

US 2016/0226652 A1  Aug. 4, 2016

Related U.S. Application Data

(63) Continuation of application No. 14/187,130, filed on Feb. 21, 2014, now Pat. No. 9,264,125, which is a
(Continued)

(51) Int. Cl.
*H04L 5/14* (2006.01)
*H04B 1/28* (2006.01)
(Continued)

(52) U.S. Cl.
CPC ......... *H04L 5/1461* (2013.01); *H04B 1/0064* (2013.01); *H04B 1/0096* (2013.01);
(Continued)

(58) Field of Classification Search
CPC .. H04B 1/28; H04B 1/38; H04B 7/14; H04W 84/20
See application file for complete search history.

(56) References Cited

U.S. PATENT DOCUMENTS 5,459,676 A   10/1995   Livingston
5,754,799 A   5/1998    Hiles
(Continued)

OTHER PUBLICATIONS

Portions of prosecution history of U.S. Appl. No. 13/219,592, filed Jan. 30, 2014, Moshfeghi, Mehran.
(Continued)

*Primary Examiner* — Dung B Huynh
(74) *Attorney, Agent, or Firm* — Makoui Law, PC

(57) ABSTRACT

A decentralized communication device is provided that facilitates optimal positioning and orientation of one or more antennas for wireless communication with external devices. The decentralized communication device includes one or more master components and one or more slave components. The master and the slave components are physically separate and communicate wirelessly. In some embodiments the slave acts as a carrier frequency translator between the master and an external wireless device, where it communicates with the external device using a first frequency and communicates with the master using a second frequency which is different from the first frequency. In another embodiment the slave has most or all the physical layer to do the digital coding, digital modulation, data framing, data formatting and data packetization for communicating with an external device, in which case digital coding and digital modulation is distributed between the master and the slave.

20 Claims, 20 Drawing Sheets

Related U.S. Application Data continuation of application No. 13/219,592, filed on Aug. 26, 2011, now Pat. No. 8,660,057.

(60) Provisional application No. 61/377,407, filed on Aug. 26, 2010.

(51) Int. Cl.
| | | |
|---|---|---|
| *H04B 1/38* | (2015.01) | |
| *H04B 7/14* | (2006.01) | |
| *H04W 84/20* | (2009.01) | |
| *H04B 1/00* | (2006.01) | |
| *H04L 27/00* | (2006.01) | |

(52) U.S. Cl.
CPC .............. *H04B 1/28* (2013.01); *H04B 1/38* (2013.01); *H04B 7/14* (2013.01); *H04L 27/0002* (2013.01); *H04W 84/20* (2013.01)

(56) References Cited

U.S. PATENT DOCUMENTS

| | | | |
|---|---|---|---|
| 6,091,362 A * | 7/2000 | Stilp | G01S 5/02 342/457 |
| 6,785,341 B2 | 8/2004 | Walton et al. | |
| 6,898,235 B1 * | 5/2005 | Carlin | H04B 1/001 342/147 |
| 7,068,973 B1 * | 6/2006 | Lovinggood | H04B 7/15514 455/11.1 |
| 7,352,718 B1 * | 4/2008 | Perahia | H04B 7/0413 370/210 |
| 7,620,424 B2 | 11/2009 | Cetiner et al. | |
| 7,986,235 B2 | 7/2011 | Posamentier | |
| 8,660,057 B2 * | 2/2014 | Moshfeghi | H04B 1/28 370/235 |
| 9,264,125 B2 * | 2/2016 | Moshfeghi | H04B 1/28 |
| 2004/0063438 A1 | 4/2004 | Hsu et al. | |
| 2004/0090924 A1 * | 5/2004 | Giaimo | H04W 40/00 370/252 |
| 2004/0120386 A1 | 6/2004 | Grilli et al. | |
| 2004/0148632 A1 | 7/2004 | Park et al. | |
| 2004/0176130 A1 * | 9/2004 | Tsai | G11B 19/00 455/556.1 |
| 2004/0185884 A1 | 9/2004 | Marin et al. | |
| 2004/0192204 A1 * | 9/2004 | Periyalwar | H04W 52/46 455/25 |
| 2004/0240402 A1 * | 12/2004 | Stephens | H04W 48/02 370/310 |
| 2005/0135321 A1 | 6/2005 | Sharony | |
| 2005/0195786 A1 | 9/2005 | Shpak | |
| 2005/0239455 A1 * | 10/2005 | Stephens | H04W 74/06 455/426.2 |
| 2005/0271030 A1 | 12/2005 | Lin | |
| 2006/0040670 A1 * | 2/2006 | Li | H04L 45/42 455/445 |
| 2006/0205509 A1 | 9/2006 | Hirota | |
| 2006/0209752 A1 * | 9/2006 | Wijngaarden | H04W 4/04 370/328 |
| 2007/0010197 A1 | 1/2007 | Yokosawa et al. | |
| 2007/0030824 A1 * | 2/2007 | Ribaudo | G01S 5/0018 370/328 |
| 2007/0121744 A1 | 5/2007 | Zuckerman et al. | |
| 2007/0155315 A1 * | 7/2007 | Lee | H04B 7/2606 455/11.1 |
| 2007/0202803 A1 | 8/2007 | Miyoshi | |
| 2007/0218853 A1 * | 9/2007 | Yu | H04B 7/0814 455/272 |
| 2007/0224951 A1 * | 9/2007 | Gilb | H01Q 3/26 455/127.5 |
| 2008/0039131 A1 | 2/2008 | Kaminski et al. | |
| 2008/0117961 A1 * | 5/2008 | Han | H04B 7/043 375/227 |
| 2008/0159243 A1 * | 7/2008 | Rofougaran | H01L 23/48 370/338 |
| 2008/0166967 A1 * | 7/2008 | McKillop | H04W 52/50 455/41.2 |
| 2008/0279130 A1 * | 11/2008 | Lewis | H04W 52/0225 370/311 |
| 2008/0285524 A1 * | 11/2008 | Yokoyama | H04B 7/0632 370/336 |
| 2008/0293446 A1 * | 11/2008 | Rofougaran | H01L 23/49855 455/552.1 |
| 2009/0010316 A1 | 1/2009 | Rofougaran | |
| 2009/0034498 A1 * | 2/2009 | Banerjea | H04W 76/025 370/338 |
| 2009/0111476 A1 | 4/2009 | Hamalainen et al. | |
| 2009/0168602 A1 * | 7/2009 | Wilcox | G01V 1/223 367/76 |
| 2009/0175251 A1 * | 7/2009 | Litzinger | H04W 74/0816 370/338 |
| 2009/0227203 A1 * | 9/2009 | Guerreri | H03D 7/16 455/39 |
| 2010/0002622 A1 * | 1/2010 | Huo | H04B 7/2606 370/315 |
| 2010/0067499 A1 | 3/2010 | Oota | |
| 2010/0077031 A1 * | 3/2010 | Yoneda | H04M 1/7253 709/204 |
| 2010/0080165 A1 * | 4/2010 | Hossain | H04B 7/155 370/315 |
| 2010/0168941 A1 | 7/2010 | Geiger et al. | |
| 2010/0246539 A1 | 9/2010 | Guillouard et al. | |
| 2010/0255852 A1 | 10/2010 | Chen et al. | |
| 2010/0303026 A1 | 12/2010 | Chaudhri et al. | |
| 2010/0303134 A1 | 12/2010 | Kawasaki | |
| 2010/0321122 A1 | 12/2010 | Smiley | |
| 2011/0110345 A1 * | 5/2011 | Heidari | H04W 40/06 370/338 |
| 2011/0138019 A1 | 6/2011 | Bae et al. | |
| 2011/0261711 A1 * | 10/2011 | Kronestedt | H04B 7/0608 370/252 |
| 2011/0268446 A1 * | 11/2011 | Cune | H04B 10/25753 398/79 |
| 2012/0115537 A1 | 5/2012 | Gaal et al. | |
| 2012/0122407 A1 * | 5/2012 | Allpress | H04B 7/0632 455/67.11 |
| 2012/0155422 A1 | 6/2012 | Medbo et al. | |

OTHER PUBLICATIONS

Portions of prosecution history of U.S. Appl. No. 14/187,130, filed Nov. 24, 2015, Moshfeghi, Mehran.

Author Unknown, "HD Radio™ Air Interface Design Description—Program Service Data," Rev. C., Mar. 31, 2005, 60 pages, iBiquity Digital Corporation, Columbia, MD., USA.

Author Unknown, "HD Radio™ AM Transmission System Specifications," Rev. E., Jan. 30, 2008, 17 pages, iBiquity Digital Corporation, Columbia, MD., USA.

Author Unknown, "HD Radio™ FM Transmission System Specifications," Rev. E., Jan. 30, 2008, 14 pages, iBiquity Digital Corporation, Columbia, MD., USA.

Author Unknown, "Part 11: Wireless LAN Medium Access Control (MAC) and Physical Layer (PHY) Specifications," IEEE Std 802.11™-2012, Mar. 29, 2012, 2793 pages, IEEE, New York, USA.

Author Unknown, "Part 11: Wireless LAN Medium Access Control (MAC) and Physical Layer (PHY) Specifications; Amendment 2: MAC Enhancements for Robust Audio Video Streaming," IEEE Std 802.11aa™-2012, May 29, 2012, 162 pages, IEEE, New York, USA.

Author Unknown, "Part 11: Wireless LAN Medium Access Control (MAC) and Physical Layer (PHY) Specifications: Amendment 3: Enhancements for Very High Throughput in the 60 GHz Band," IEEE Std 802.11ad™-2012, Dec. 28, 2012, 628 pages, IEEE, New York, USA.

Author Unknown, "Part 11: Wireless LAN Medium Access Control (MAC) and Physical Layer (PHY) Specifications: Amendment 1: Prioritization of Management Frames," IEEE Std 802.11ae™-2012, Apr. 6, 2012, 52 pages, IEEE, New York, USA.

Author Unknown, "Part 11: Wireless LAN Medium Access Control (MAC) and Physical Layer (PHY) specifications: Higher-Speed

(56) References Cited

OTHER PUBLICATIONS

Physical Layer Extension in the 2.4 GHz Band," IEEE Std. 802.11b-1999, Sep. 16, 1999, 97 pages, IEEE, New York, USA.
Author Unknown, "Part 11: Wireless LAN Medium Access Control (MAC) and Physical Layer (PHY) specifications: Amendment 4: Further Higher Data Rate Extension in the 2.4 GHZ Band," IEEE Std. 802.11g™-2003, Jun. 12, 2003, 77 pages, IEEE, New York, USA.
Author Unknown, "Part 11: Wireless LAN Medium Access Control (MAC) and Physical Layer (PHY) specifications: Amendment 5: Enhancements for Higher Throughput," IEEE Std 802.11n™-2009, Oct. 29, 2009, 536 pages, IEEE, New York, USA.
Author Unknown, "Part 11: Wireless LAN Medium Access Control (MAC) and Physical Layer (PHY) specifications: High-speed Physical layer in the 5 GHz Band," IEEE Std 802.11a-1999, Month Unknown, 1999, 91 pages, IEEE.
Author Unknown, "Part 15.4: Wireless Medium Access Control (MAC) and Physical Layer (PHY) Specifications for Low-Rate Wireless Personal Area Networks (WPANs); Amendment 1: Add Alternate PHYs," IEEE Std 802.154a™-2007, Aug. 31, 2007, 203 pages, IEEE, New York, USA.
Author Unknown, "Master Table of Contents & Compliance Requirements," Specification of the Bluetooth System Versio 4.0, Jun. 30, 2010, 106 pages, vol. 0, Bluetooth SIG, Inc.
Author Unknown, "Architecture & Terminology Overview," Specification of the Bluetooth System Version 4.0, Jun. 30, 2010, 140 pages, vol. 1, Bluetooth SIG, Inc.
Author Unknown, "Core System Package: BR/EDR Controller Volume," Specification of the Bluetooth System Version 4.0, Jun. 30, 2010, 1114 pages, vol. 2, Bluetooth SIG, Inc.
Author Unknown, "Core System Package: Host Volume," Specification of the Bluetooth System Version 4.0, Jun. 30, 2010, 656 pages, vol. 3, Bluetooth SIG, Inc.
Author Unknown, "Host Controller Interface: Transport Layer," Specification of the Bluetooth System Version 4.0, Jun. 30, 2010, 88 pages, vol. 4, Bluetooth SIG, Inc.
Author Unknown, "Core System Package: AMP Controller Volume," Specification of the Bluetooth System Version 4.0, Jun. 30, 2010, 59 pages, vol. 5, Bluetooth SIG, Inc.
Author Unknown, "Core System Package: Low Energy Controller Volume," Specification of the Bluetooth System Version 4.0, Jun. 30, 2010, 138 pages, vol. 6, Bluetooth SIG, Inc.
Author Unknown, "WiMAX Forum® Air Interface Specifications," Apr. 4, 2011, 102 pages, WiMAX Forum.
Author Unknown, "WirelessHD Specification Version 1.1 Overview," May 2010, 95 pages.
Author Unknown, "802.11ac: The Fifth Generation of Wi-Fi," Technical White Paper, Aug. 2012, pp. 1-25, Cisco.

\* cited by examiner

METHOD AND SYSTEM FOR DISTRIBUTED COMMUNICATION

CLAIM OF BENEFIT TO PRIOR APPLICATIONS

The present Application is a continuation application of U.S. patent application Ser. No. 14/187,130, entitled "Method and System for Distributed Communication," filed Feb. 21, 2014, published as U.S. Patent Publication 2014-0241218. U.S. patent application Ser. No. 14/187,130 is a continuation application of U.S. patent application Ser. No. 13/219,592, entitled "Method and System for Distributed Communication," filed Aug. 26, 2011, issued as U.S. Pat. No. 8,660,057. U.S. patent application Ser. No. 13/219,592 claims the benefit of U.S. Provisional Patent Application 61/377,407, entitled, "Method and System for Distributed Communication System," filed Aug. 26, 2010. The contents of U.S. patent application Ser. No. 14/187,130, published as U.S. Patent Publication 2014-0241218, U.S. patent application Ser. No. 13/219,592, issued as U.S. Pat. No. 8,660,057 and U.S. Provisional application 61/377,407 are hereby incorporated by reference.

BACKGROUND

Centralized communication devices typically include baseband, radio modem, and radio front-end. The modem modulates and demodulates the carrier signals to encode and decode the transmitted and received information. The front-end includes a power amplifier to amplify the signal being transmitted, a low noise amplifier to amplify the received signals, a time or frequency duplexer, and an antenna to send and receive signals to/from external devices. In a centralized system, the radio modem and the radio front-end are physically together, often as a single integrated circuit chip or several chips fixed on circuit boards that cannot move against each other.

Many applications require flexibility in changing the position or orientation of antennas. However, in a centralized communication device, the positions are fixed on an integrated chip or a circuit board and there is no flexibility in changing the position. This limits the optimal positioning and orientation of the antenna, which in turn results in lower sensitivity and lower performance of the system.

BRIEF SUMMARY

This focus of this invention is an improved architecture where a centralized wireless communication system is divided into smaller components. These components are then distributed and placed at different locations for improved performance. The sub-components can support multiple communication mechanisms and standards and more than one sub-component can be used to improve performance.

A decentralized communication device is provided that facilitates optimal positioning and orientation of one or more antennas for communicating with external devices. The decentralized communication device includes one or more master components and one or more slave components. The master and the slave components are physically separate and communicate wirelessly.

The slave includes the antennas for communicating with external devices as well as a front-end for sending signals to and receiving signals from the antennas. In some embodiments, the front-end includes a time or frequency duplexer, one or more power amplifiers to amplify signals that are sent to the antennas, and one or more low noise amplifiers for amplifying signals received from the antennas. The slave also includes one or more smaller antennas to wirelessly communicate with the master. The slave acts as a frequency translator between the master and an external wireless device. The slave transmits only the information that the slave receives from the master to the external devices. In some embodiments, the slave communicates with the external device using a first frequency and communicates with the master using a second frequency which is higher than the first frequency.

The master includes a digital baseband module and a radio modem. The digital baseband receives bits of digital data and performs digital modulation on the data and sends the digital signal to the radio modem. The radio modem in some embodiments converts the digital signal to analog signal, performs filtering and gain control, and up-converts a carrier frequency. The radio modem sends the encoded signal to a front-end dedicated to one or more small antennas that are used to wirelessly communicate with the small antennas of the slave.

The radio modem also down-converts received signals from the carrier frequency, performs analog to digital conversion and sends the information to the baseband module for processing. Placing the large antennas required to communicate with the external devices in the slave which is physically separate from the master, allows the slave antennas to be placed in more optimal locations and more optimal orientations to achieve improved sensitivity, performance, and diversity.

In some embodiments, one or more masters and one or more slaves are included in an electronic device such as a television (TV), a computer, a laptop, a gaming device, etc. to use the master to communicate wirelessly with external devices by using the slaves as intermediaries. In some of these embodiments, the master performs beam-forming by changing the radio frequency (RF) delays, phases and amplitudes for different slaves in order to maximize the signal received at the external device.

Some embodiments implement Multiple Input Multiple Output (MIMO) wireless communication between the master and slave and/or between the slave and the external devices to improve system performance. One advantage of this method is that by separating the front-end from the master, the multiple antennas of the slaves can be placed further apart and hence provide better antenna diversity since the antennas will experience different multipath and fading characteristics. The greater distance between the antennas of the slaves means less interference between the antennas. MIMO wireless systems use diversity coding to improve system performance. With diversity coding the signal is coded using space-time coding methods. These coding methods exploit the independent fading characteristics of the multiple antenna signal paths. MIMO systems also offer spatial multiplexing where a signal is divided into several lower rate streams and each stream is transmitted from a different transmit antenna in the same frequency channel. Spatial multiplexing increases channel capacity at higher signal to noise ratios (SNR).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
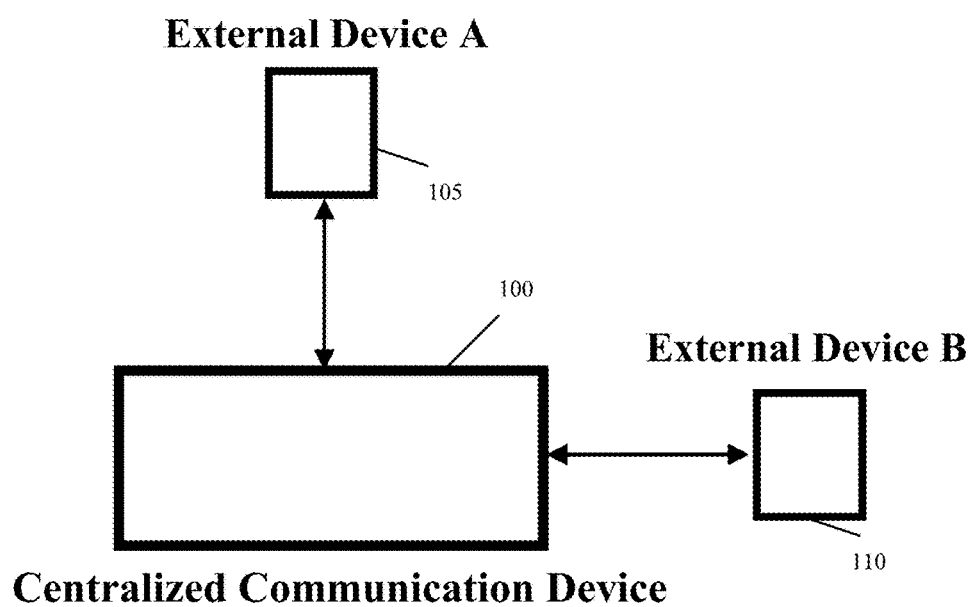
FIG. 1 illustrates a centralized communication device that communicates with two external devices according to prior art.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A decentralized communication device is provided that facilitates optimal positioning and orientation of one or more antennas for communicating with external devices. The decentralized communication device includes one or more master components and one or more slave components. The master and the slave components are physically separate and communicate wirelessly.

The slave includes the antennas for communicating with external devices as well as a front-end for sending signals to and receiving signals from the antennas. In some embodiments, the front-end includes a time or frequency duplexer, one or more power amplifiers to amplify signals that are sent to the antennas, and one or more low noise amplifiers for amplifying signals received from the antennas. The slave also includes one or more smaller antennas to wirelessly communicate with the master. The slave acts as a frequency translator between the master and an external wireless device. The slave transmits only the information that the slave receives from the master to the external devices. In some embodiments, the slave communicates with the external device using a first frequency and communicates with the master using a second frequency which is higher than the first frequency.

The master includes a digital baseband module and a radio modem. The digital baseband receives bits of digital data and performs digital modulation on the data and sends the digital signal to the radio modem. The radio modem in some embodiments converts the digital signal to analog signal, performs filtering and gain control, and up-converts a carrier frequency. The radio modem sends the encoded signal to a front-end dedicated to one or more small antennas that are used to wirelessly communicate with the small antennas of the slave.

The radio modem also down-converts received signals from the carrier frequency, performs analog to digital conversion and sends the information to the baseband module for processing. Placing the large antennas required to communicate with the external devices in the slave which is physically separate from the master, allows the slave antennas to be placed in more optimal locations and more optimal orientations to achieve improved sensitivity, performance, and diversity.

The master and the slave have independent power sources in some embodiments. The slave in some embodiments operates with wireless power (RF or induction), or has small batteries that are rechargeable.

In some embodiments, one or more masters and one or more slaves are included in an electronic device such as a television (TV), a computer, a laptop, a gaming device, etc. to use the master to communicate wirelessly with external devices by using the slaves as intermediaries. In some of these embodiments, the master performs beam-forming by changing the radio frequency (RF) delays, phases and amplitudes for different slaves in order to maximize the signal received at the external device.

In some embodiments, an electronic device (e.g. TV, laptop) uses distributed slaves, where the slaves use different frequencies and standards for communicating with external wireless devices, thereby becoming a wireless router and supporting different wireless standards such as Wireless Local Area Network (WLAN) 802.11*, 802.11ac, 802.11ad, cellular (second generation (2G), third generation (3G), fourth generation (4G), etc.), Bluetooth®, Worldwide Interoperability for Microwave Access (WiMAX), 60 GHz, HD Radio™ and Ultra-wideband standards.

The external device in some embodiments is a gaming remote and a group of slaves are used to track the remote and give tracking information to the master which gives it to the gaming controller. The remote in some embodiments is small enough that it is wearable on human fingers. The remote in some of these embodiments also operates with wireless power or has small batteries that are rechargeable.

Some embodiments implement Multiple Input Multiple Output (MIMO) wireless communication between the master and slave and/or between the slave and the external devices to improve system performance. One advantage of this method is that by separating the front-end from the master, the multiple antennas of the slaves can be placed further apart and hence provide better antenna diversity since the antennas will experience different multipath and fading characteristics. The greater distance between the antennas of the slaves means less interference between the antennas. MIMO wireless systems use diversity coding to improve system performance. With diversity coding the signal is coded using space-time coding methods. These coding methods exploit the independent fading characteristics of the multiple antenna signal paths. MIMO systems also offer spatial multiplexing where a signal is divided into several lower rate streams and each stream is transmitted from a different transmit antenna in the same frequency channel. Spatial multiplexing increases channel capacity at higher signal to noise ratios (SNR).

Some embodiments support multiple wireless communication standards (e.g. WLAN, 802.11*, 802.11ac, 802.11ad, cellular second generation (2G), cellular third generation (3G), cellular fourth generation (4G), Bluetooth®, Worldwide Interoperability for Microwave Access (WiMAX), 60 GHz, HD Radio™ and Ultra-wideband standards). The master and slave and/or the slave and the external devices in some embodiments communicate with more than one radio type (e.g. Bluetooth® and WLAN) at the same time, or they communicate with more than one radio type at different times. In some embodiments, the slave includes a signal processing component for demodulating, re-modulating and reformatting for other standards.

Some embodiments include more than one master and/or more than one slave for improved performance. In some of these embodiments the processing of the information is distributed between the slaves, the master (or masters if there are more than one) and other devices such as a gaming controller or a network server or cloud computing server. A master in some embodiments chooses a number of slaves from a group of slaves and uses them to communicate with an external device. The master in some embodiments uses beam-forming when communicating internally with each slave. In some embodiments the master uses beam-forming between a group of slaves that communicate with an external device. In some embodiments, the master uses space-time coding and individual multi-antenna slaves do beam-forming for communicating with an external device. The master uses space-time-frequency coding in some embodiments where the slaves use different frequencies to communicate with the external device.

The master in some embodiments chooses which group of slaves out of a matrix of slaves to communicate with based on a selection criteria such as optimal Bit Error Rate (BER), SNR, power consumption, or Electronic Vector Magnitude (EVM). This can be done dynamically, where if an obstacle is introduced between one of the slaves and the external device, then the master dynamically switches to another slave, or if the battery level is low the master chooses a fewer slaves (e.g., two slaves instead of four) for diversity coding.

Some embodiments provide a decentralized communication device is provided that facilitates optimal positioning and orientation of one or more antennas for wireless communication with external devices. The decentralized communication device includes one or more master components and one or more slave components. The master and the slave components are physically separate and communicate wirelessly. In some embodiments the slave acts as a carrier frequency translator between the master and an external wireless device, where it communicates with the external device using a first frequency and communicates with the master using a second frequency which is different from the first frequency.

In other embodiments the slave has most or all the physical layer to do the digital coding, digital modulation, data framing, data formatting and data packetization for communicating with an external device, in which case digital coding and digital modulation is distributed between the master and the slave. In yet other embodiments the master uses slave-to-slave communication to exchange information with an external device. In some embodiments, one or more masters and one or more slaves are included in an electronic device to use a master to communicate wirelessly with external devices by using a subset of the slaves as intermediaries. Some embodiments implement MIMO wireless communication and/or beam-forming to improve system performance. In some embodiments the slaves and/or the masters operate with wireless power. In other embodiments two masters may communicate directly with each other without using any slaves. Several more detailed embodiments of the invention are described in sections below.

I. Decentralizing Components of a Communication System

A. Overview

FIG. 1 illustrates a centralized communication device that communicates with two external devices according to prior art. The communication between the centralized communication device 100 and the external devices 105 and 110 could be done by wireless or wired methods such as radio-frequency, microwave, laser, optical, ultrasound, induction, or other electromagnetic methods.

Figure 2:
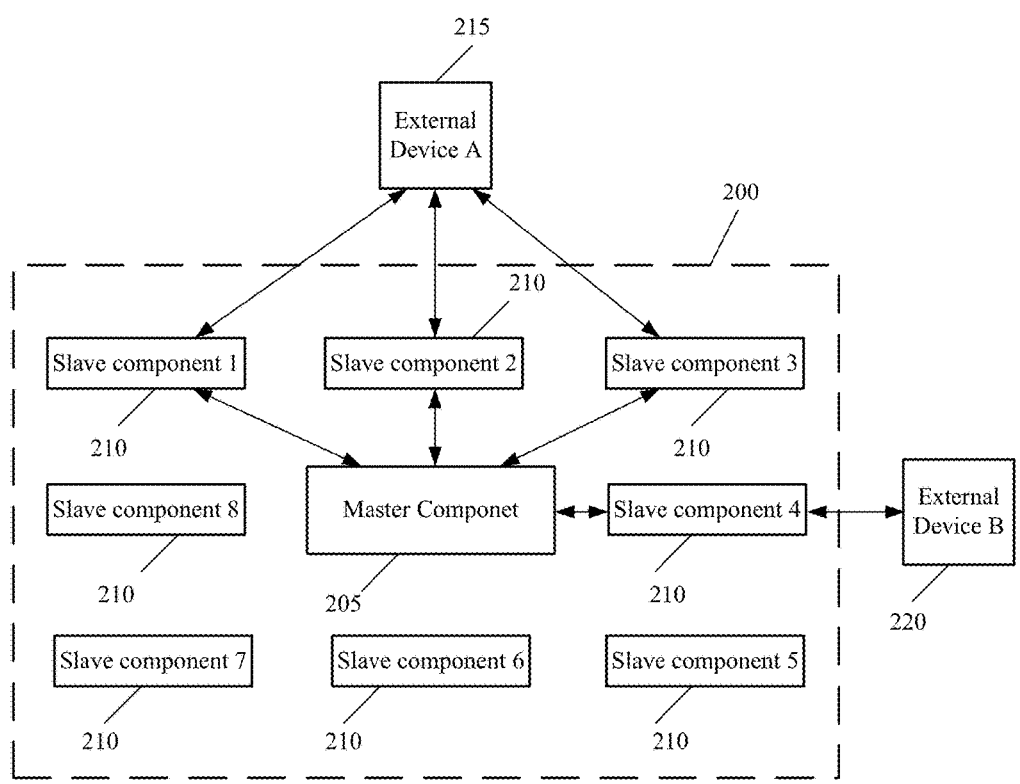
FIG. 2 conceptually illustrates an overview of a decentralized communication device in some embodiments of the invention.

FIG. 2 conceptually illustrates an overview of a decentralized communication device 200 in some embodiments of the invention. In contrast with the centralized communication device of FIG. 1, the decentralized centralized communication device 200 is divided into distributed sub-components. The sub-components include at least one master component 205 (also referred to as master sub-component, master unit, or master device) and one slave component 210 (also referred to as slave sub-component, slave unit, or slave device). Some embodiments include more than one master and/or more than one slave. Also, the master and the slave each includes several components, modules, blocks, or units which are described further below.

In some embodiments, a master component uses one or more slave components to communicate with external devices. For instance, in FIG. 2 the master 205 uses slave components 1, 2 and 3 to communicate with external device A 215. The figure also shows the master 205 using slave component 4 to communicate with external device B 220. The master 205 and each slave sub-component 210 can communicate with different mechanisms such as a wire, or wireless methods such as radio-frequency, microwave, laser, optical, induction, or other electromagnetic methods. For example, one slave can use a wire while another slave uses optics and another slave uses RF, etc. The slave and external devices can also use one or more of these methods to communicate with each other.

Figure 3:
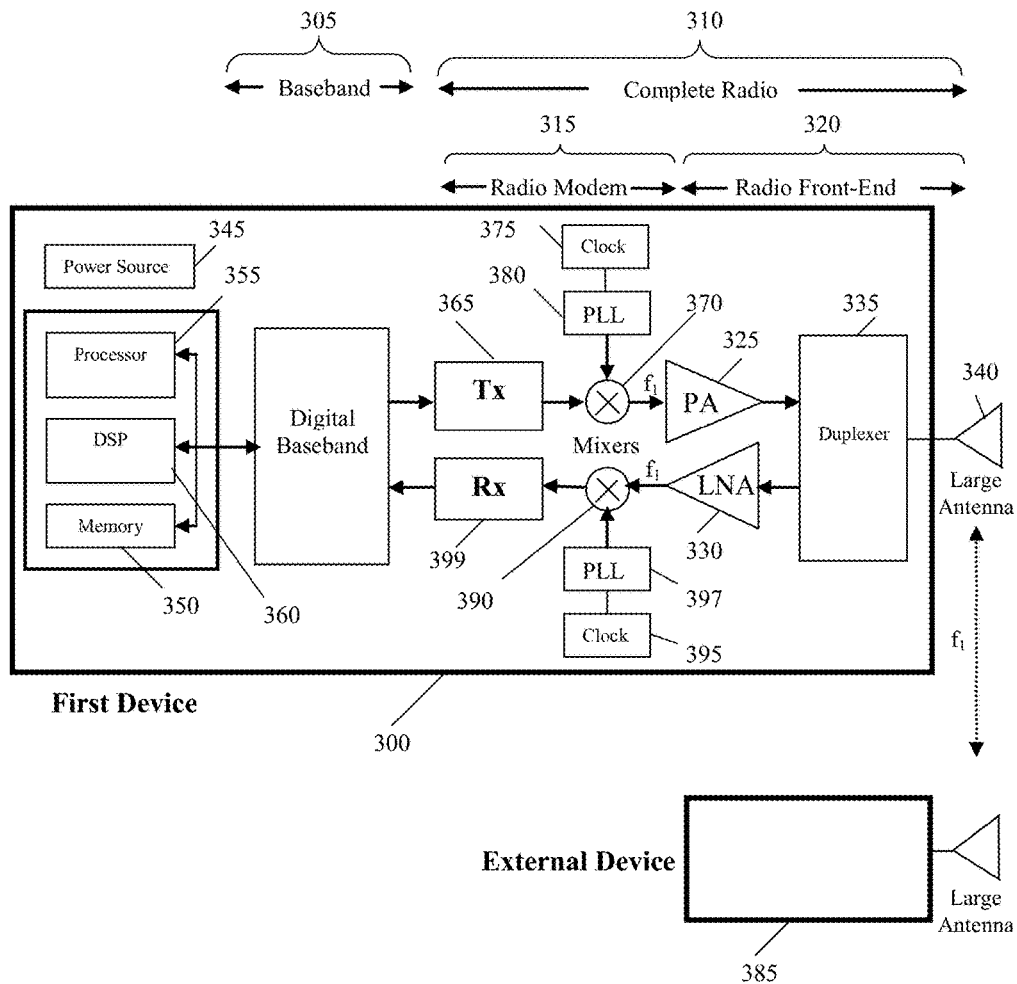
FIG. 3 illustrates a device with a conventional centralized Radio Frequency (RF) communication device according to prior art.

FIG. 3 illustrates a device 300 with a conventional centralized Radio Frequency (RF) communication system according to prior art. One conceptual partitioning of the system is the digital baseband 305 and the complete radio 310, as shown in FIG. 3. The complete radio 310 can be further conceptually partitioned into the modem 315 and the front-end 320, as shown in FIG. 3. The modem 315 performs digital to analog conversion and up-converts to a carrier frequency for transmission by antenna. In some systems the up-conversion is a two-step process where Tx 365 up-converts from 0 to an intermediate frequency and mixer 370 up-converts to carrier frequency $f_1$. The modem also down-converts from carrier frequency the signals received from the antenna and performs analog to digital conversion. The front-end includes the Power Amplifier (PA) 325, Low Noise Amplifier (LNA) 330, duplexer 335, and antenna 340. In a centralized system the radio modem and the radio front-end are physically close together, often as a single integrated circuit chip or on circuit boards physically connected together. The positions are fixed on an integrated chip or circuit board so there is no flexibility in changing the position. This limits the optimal positioning and orientation of the antenna, which in turn results in lower sensitivity and performance of the system.

In FIG. 3, the radio system 300 has a power source 345 for all its components. During transmission the system's digital baseband 305 receives bits of data from memory 350, a Digital Signal Processor (DSP) 355, and/or a processor 360. The digital baseband then performs digital coding to reduce redundancy and generate symbols. It also performs digital modulation. Additional functions performed by the baseband are data formatting and framing for a particular standard (e.g. 802.11) and data packetization. The baseband modulated signals are then fed to a transmitter (Tx) 365. Transmitter 365 may also perform some coding and digital modulation prior to using its Digital to Analog Converter (DAC) for analog conversion of the signal. Thus, coding and digital modulation is performed by baseband 305 and transmitter 365. Partitioning of these digital operations can vary from one system to another. Some examples of coding are convolutional coding and Viterbi coding. Some examples of digital modulation techniques are Quadrature Phase-Shift Keying (QPSK), Frequency-Shift Keying (FSK), Amplitude-Shift Keying (ASK), and Quadrature Amplitude Modulation (QAM).

The transmitter 365 also performs filtering and gain control, before feeding the signal into an up-converter mixer 370. A clock 375 and a Phase Lock Loop (PLL) synthesizer 380 are used to generate an RF transmit carrier frequency, which is mixed with the transmitter's signal to generate a modulated RF carrier signal of frequency $f_1$. This signal is then amplified by a Power Amplifier (PA) 325 and fed to a frequency or time duplexer 335. The duplexer 335 connects the PA's output signal to an antenna 340 during transmission so that the antenna 340 radiates the modulated RF signal over the airwaves to a receiver (e.g. the an external device 385) or set of receivers. In transmission path, the baseband frequency (e.g., frequency of 0) is either up-converted by the mixers to a carrier frequency (e.g., 60 GHz) or the baseband frequency is converted by the transmitter to an intermediate frequency and then the intermediate frequency is up-converted by the mixers to the carrier frequency. In receiver path, the reserve conversions are performed.

During reception the radio system's antenna 340 receives an RF modulated carrier signal of frequency $f_1$ and the duplexer 335 connects the antenna 340 to a Low Noise Amplifier (LNA) 330. The LNA 330 amplifies this signal and feeds it to a down-converter mixer 390. A clock 395 and a Phase Lock Loop (PLL) synthesizer 397 are used to generate an RF signal of the same $f_1$ frequency as the transmit carrier frequency. The down-converter mixer 390 down-converts the signal by mixing it with this RF generated signal. In some systems the down-conversion is a two-step process where mixer 390 down-convert to an intermediate frequency and Rx 399 down-converts to 0.

The down-converted signal is then fed to a receiver (Rx) 399 which includes an Analog to Digital Convertor (ADC). The receiver 399 performs analog gain control and filtering before feeding the signal to its ADC for digital conversion. Receiver 399 may then also perform some digital demodulation and decoding after the digital conversion of the signal. The digital baseband 305 then processes the digital signal with decoding and demodulation operations to extract the data bits. Thus, digital demodulation is performed by receiver 399 and baseband 305. The baseband then provides the extracted data to the processor 355, DSP 360, and/or memory 350. The size of the antenna 340 depends on the frequency $f_1$; the lower the frequency the larger the antenna.

B. Master and Slave Components with Single Internal Antenna

Figure 4:
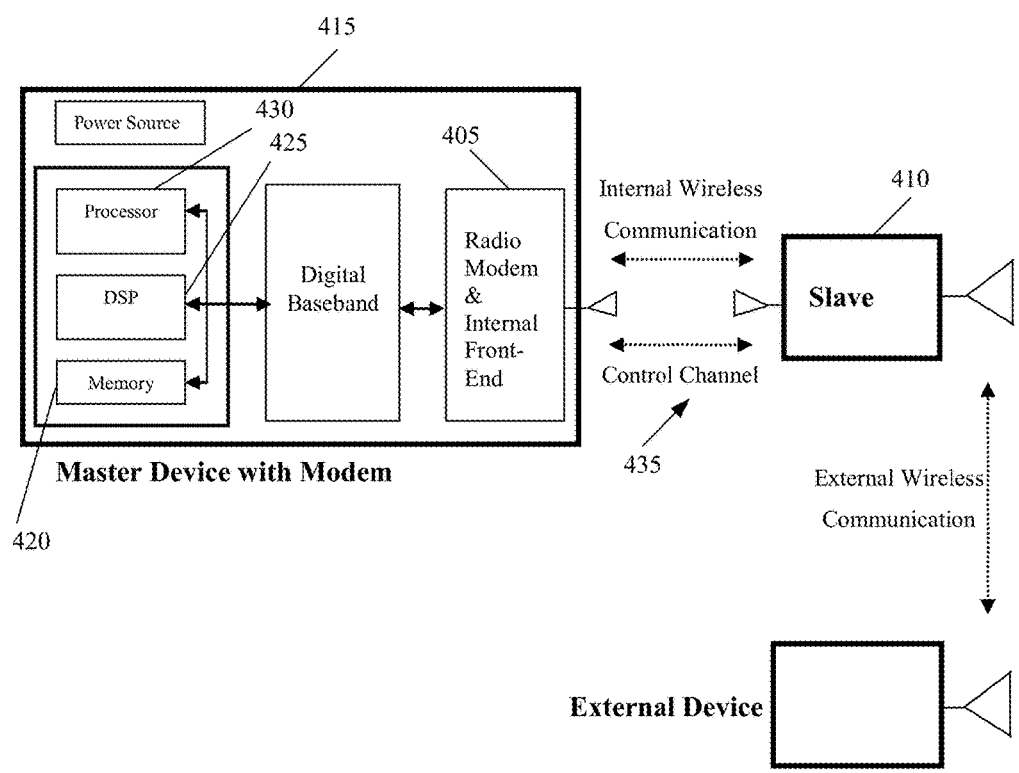
FIG. 4 conceptually illustrates a distributed communication device in some embodiments of the invention.

The examples illustrated throughout this specification use a Radio Frequency (RF) wireless communication system to demonstrate the invention. However, the architecture is general and applies to other wireless communication systems. FIG. 4 conceptually illustrates a distributed communication device in some embodiments of the invention. The radio modem 405 and the front-end (labeled "Slave") 410 are distributed at separate locations and transfer data wirelessly to each other. In this embodiment, the modem 405 is part of another component of the device (labeled Master) 415 and transfers data to/from this component's memory 420, DSP 425, and/or a processing unit (such as a processor) 430.

The slave is not an independent system and acts as a slave to the master. For instance, the slave does not transmit information generated by the slave to an external device 450. The master doesn't always generate information that it transmits to the slave (e.g., it may receive it from an outside memory or DSP). In one application a person talks into a device. The device digitizes the voice and sends the digitized voice data to the master. The master then performs digital coding, modulation, and packetization before transmitting the data to the slave, and the slave re-transmits the data to an external device. In another application the master receives information wirelessly from a slave or set of slaves that originated from an external device, and retransmit the information (through wire) to an electronic device (e.g., to a TV's processor or a game controller). The slave re-transmits information it receives from the master. In some embodiments the master instructs a first slave to communicate with a second slave, and the second slave communicates with an external device. This could be extended where the second slave communicates with a third slave and the third slave communicates with an external device. In another embodiment a master communicates directly with another master without using any slaves in between.

The slave 410 is comprised primarily of a PA, LNA, duplexer and antenna, but in some embodiments also includes other components (or modules). In some embodiments the slave 410 also has its own radio modem. For example, the slave 410 in some embodiments includes most or all the physical layer to do coding and digital modulation. The wireless communication between the master 405 and the front-end 410 is RF, microwave, laser, induction, optical or other electromagnetic frequencies and methods in different embodiments. In some embodiments, however, the communication is a wire-line mechanism such as a Universal Serial Bus (USB), PCI express, cable or transmission line. The two parts 405 and 410 also use a control channel 435 for synchronization of clocks, gain control, programming, calibration and changing of parameters.

In some embodiments the master, the slave, and the external device are physically separated and are not on the same chip, circuit board, or physical device. In some embodiments some or all of the master, the slave, and the external device are on the same device but the external device's wireless communication components are on a separate circuit board from the master and the slave. In other embodiments the master, the slave and the external device are integrated circuits that are on a single board or on multiple boards of the same physical device and are used for chip-to-chip communication.

In some embodiments, master, slave, or both include one or more processing units and a machine readable or computer readable medium that includes a program to implement the methods (such as selecting different frequencies, selecting which external device(s), which slave(s), or which master(s) to communicate with, selecting different antennas to communicate, selecting a communication path that reduces interference and multipath, using a control channel to program or calibrate the slave, etc.) required for implementing the techniques discussed by reference to FIGS. 2 and 4-16 for implementing a distributed communication device.

Figure 5:
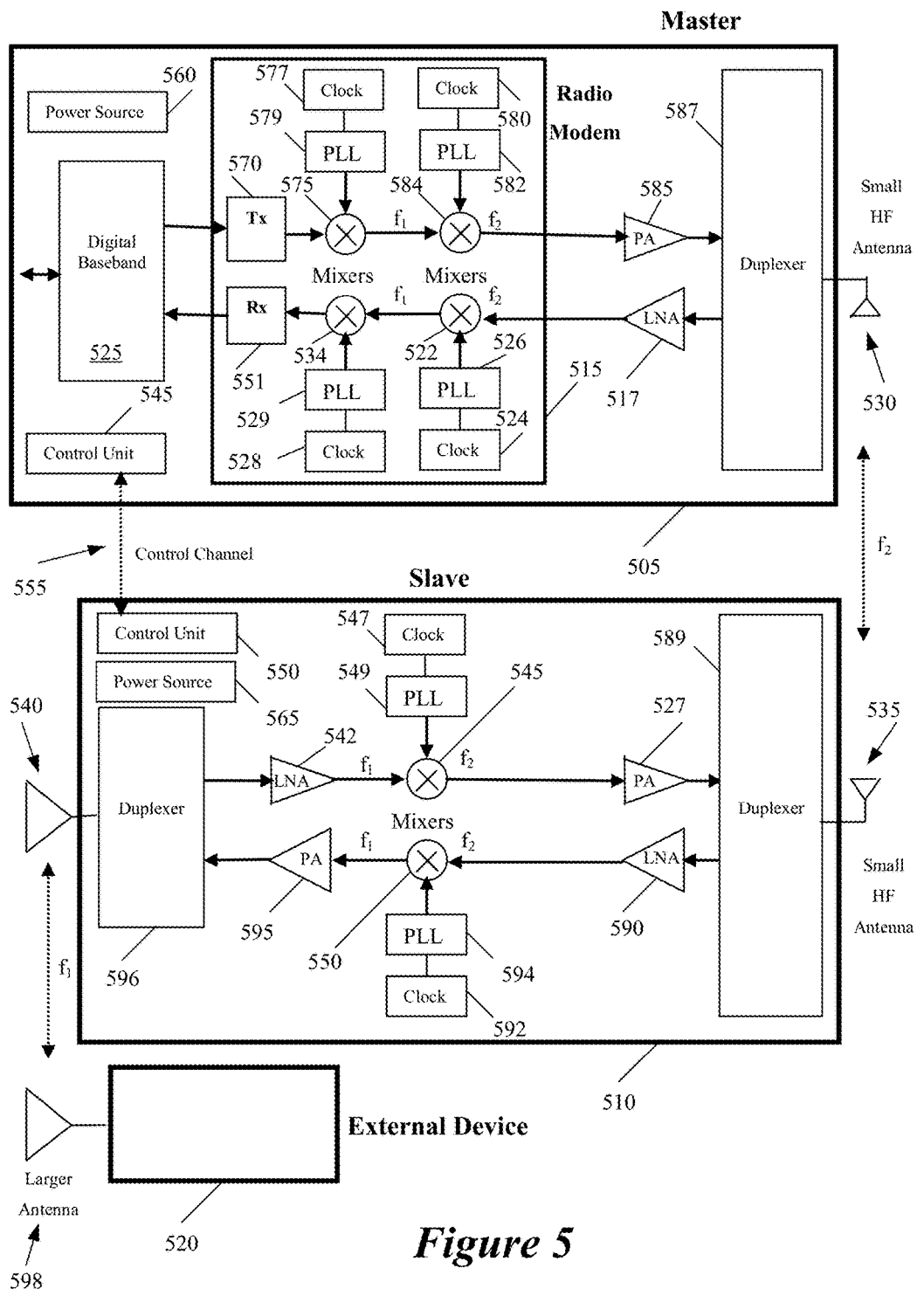
FIG. 5 conceptually illustrates a more detailed diagram of FIG. 4.

FIG. 5 conceptually illustrates a more detailed diagram of FIG. 4. In contrast to the device 300 of the centralized communication system of FIG. 3, the decentralized device of FIG. 5 is split into two components 505 and 510 that are physically separate, located at different positions, and communicate wirelessly. Component 505 can be viewed as a back-end master module that includes the modem 515. The second Component 510 can be viewed as a slave or external communication front-end module. The master 505 uses the slave 510 to communicate wirelessly with other devices such as the external device 520. The baseband 525 and modem 515 of a conventional centralized radio are in the master 505. In some embodiments, baseband 525 has its own memory, DSP, and processing unit (e.g., processor). In other embodiments, the baseband uses the master's memory, DSP, and processing unit (420, 425, 430). The baseband 525 and modem 515 perform digital coding and modulation. However, instead of using a large external antenna operating at a relatively lower carrier frequency, $f_1$, the device 505 uses a small antenna 530 that operates at a higher carrier frequency, $f_2$, to communicate internally with the slave. For example, consider the case where $f_2$ is 60 GHz and $f_1$ is 2.4 GHz. The size of the antenna is proportional to the wavelength or inversely proportional to the frequency. The size of a 60 GHz antenna (typically a few millimeters) is therefore about 25 times smaller than a 2.4 GHz antenna (typically a few centimeters). A 60 GHz antenna can therefore fit on a chip or package. It should be stated that small antenna 530, 535 and larger antenna 540 operate in a frequency band so $f_2$ and $f_1$ can vary slightly in the band range for each antenna and device. The slave performs an interconnection function, as opposed to a relaying or range extending function. With a relay device the frequencies $f_1$ and $f_2$ are close to each other and are in the same frequency band such as the 2.4 GHz band. In this specification the slave's $f_1$ and $f_2$ frequencies can be orders of magnitude different (e.g. 2.4 GHz and 60 GHz). Different components or modules of the master and the slave are described in the following paragraphs.

Master 505 includes the front-end for driving the internal antenna 530. The slave uses its small high frequency antenna 535 to communicate internally with the master 505 using carrier frequency $f_2$. However, the slave 510 also has a larger external antenna 540 that operates at the lower $f_1$ carrier frequency for communicating over larger distances with outside devices. The mixers 545 and 550 of the slave essentially convert between these two carrier frequencies, $f_1$ and $f_2$, thereby allowing the master 505 to use the slave 510 to communicate with distant devices (such as the external device 520) with carrier frequency $f_1$. Thus, master 505 performs all the digital coding/decoding and modulation/demodulation and slave 510 acts like a frequency converter by translating the carrier frequency at its two ends. Thus, master 505 and the slave 510 communicate internally with the smaller antennas and higher carrier frequency $f_2$ over short distances, while the slave 510 and external device(s) 520 communicate with the larger external antenna and lower carrier frequency $f_1$ over larger distances.

Every module in slave 510 and master 505 is programmable and can be calibrated. Examples are the tuning frequency of the PA and LNA, gain control, clock timing and synchronization, PLL parameters, capacitors, inductors, transistors, digital bits, programming, etc. The master 505 and the slave 510 each have control units 545 and 550, respectively that communicate over a control channel 555. The master in some embodiments uses control channel 555 to program and calibrate the above parameters for the slave. The slave in FIG. 5 is a simple slave that changes the carrier frequency of the master's transmission. However, other slaves are more powerful and perform additional functions such as digital coding/decoding, modulation/demodulation, and data framing and reformatting (e.g., as shown below in FIG. 6, block 615 of slave 610) that set the communication mode with the external device (e.g. 802.11/Bluetooth®/

CDMA) or change it from one standard to another (e.g. from 60 GHz standard to 802.11/Bluetooth®/CDMA standards). Thus, for a more powerful slave such as 610 the control channel is also used in some embodiments to change its mode of behavior for different standards. For example, the master can use control channel 555 to configure the slave's mode of communication with external device 520 to be Wi-Fi (802.11) or CDMA. The control channel 555 is a wire, power supply modulation, induction/magnetic coupling, or another wireless channel in different embodiments that can be a lower or higher frequency compared to the internal communication frequency which is shown as $f_2$ in FIG. 5.

The master 505 and the slave 510 both have their power sources 560 and 565, respectively, for their components. These power sources 560 and 565 are AC power, inductive power, or RF power in different embodiments. The slave in some embodiments operates with wireless power (RF or induction), and/or has small batteries that are rechargeable. The master 505 and the slave 510 get their clocks from the power signal in the embodiments that either the master or the slave does not have clocks. For example, the power supply of the master or the slave in some embodiments has a modulation such as an AC superimposed on a DC and the radio selectively filters or blocks the DC and chooses the frequency for the clock.

In some embodiments, the high carrier frequency $f_2$ corresponds to a standard's carrier frequency such as 60 GHz or 100 GHz, but in other embodiments the high frequency $f_2$ is any high frequency and the slave is just a frequency translator. For example, on transmission the master performs digital coding and digital modulation for WLAN 802.11 (where that standard uses 2.4 GHz as the carrier frequency) but the master up-converts to carrier frequency $f_2$ where $f_2$ is different from 2.4 GHz. The slave then changes the carrier frequency to $f_1$ where $f_1$ is 2.4 GHz and re-transmits to the external device. This changing of the carrier frequency does not affect the digital coding and modulation that was performed by the master; it just changes the airwave carrier frequency. When the external device is transmitting to the slave, the external device performs 802.11 digital coding and modulation and transmits with $f_1$=2.4 GHz carrier frequency to the slave. The slave changes the carrier frequency to $f_2$ and re-transmits to the master. The master then down-converts the carrier frequency, performs digital demodulation and decoding, and forwards the extracted data to its processor. This method also applies to high frequency transmission standards such as 60 GHz or 100 GHz (e.g. $f_1$=60 GHz and $f_2$=65 GHz, so both internal and external communication carrier frequencies are high).

Figure 6:
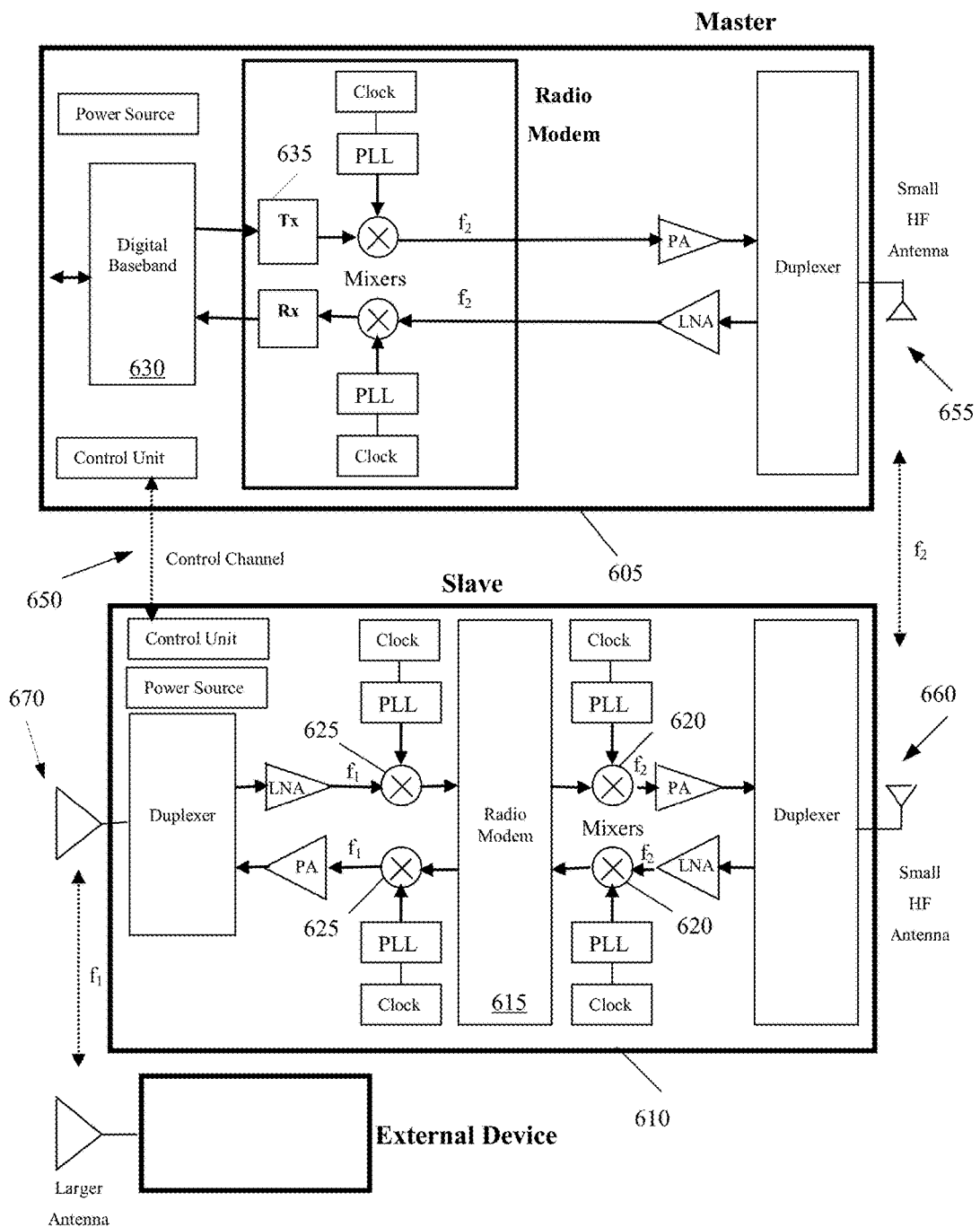
FIG. 6 conceptually illustrates the architecture of a distributed communication device of some embodiments of the invention where the slave has additional functionality compared to FIG. 5.

In other embodiments (as shown in FIG. 6, below) the slave has a radio modem with signal processing components and memory for digital coding/decoding, modulating/demodulating, and formatting/reformatting for other standards. For example, in FIG. 6 on transmission the master performs some digital modulation and up-converts to carrier frequency $f_2$. The slave receives the master's transmission, down-converts, performs demodulation, performs digital coding, performs digital modulation for the WLAN 802.11 standard, up-converts to carrier frequency 2.4 GHz, and transmits to external device.

In yet other embodiments the masters and the slaves have combined radios to support multiple wireless standards such as WLAN 802.11*, 802.11ac (<6 GHz), 802.11ad (60 GHz), cellular second generation (2G), cellular third generation (3G), cellular fourth generation (4G), Bluetooth®, Worldwide Interoperability for Microwave Access (WiMAX), 60 GHz, HD Radio™ and Ultra-wideband standards.

The master 505 illustrated in FIG. 5 uses a Radio Frequency (RF) system. The master has a power source 560 for all its components. During transmission the master 505 digital baseband 525 receives bits of data from memory, a Digital Signal Processor, DSP, and/or a processing unit (as shown in FIG. 4). In some embodiments, memory, Digital Signal Processor (DSP), and processor are part of the master. In other embodiments, the master receives the data from another device. The digital baseband generates symbols and performs digital modulation.

The baseband modulated signals are fed to a transmitter (Tx) 570 which in some embodiments performs additional digital modulation. Transmitter 570 includes a Digital to Analog Converter (DAC) for analog conversion of the signal. The transmitter 570 also performs filtering and gain control, before feeding the signal into an up-converter mixer 575. A clock 577 and a Phase Lock Loop (PLL) synthesizer 579 are used to generate an RF transmit carrier, which is mixed with the transmitter's signal to generate a modulated RF carrier signal of frequency $f_1$. A second clock 580 and Phase Lock Loop (PLL) synthesizer 582 are used to generate an RF transmit carrier, which is mixed with the transmitter's signal by a second up-converter mixer 584 to generate a modulated RF carrier signal of frequency $f_2$. In other embodiments, the two sets of up-converter mixers 575 and 584 and their associated clock and PLL are combined into one set where one mixer generates a modulated RF carrier signal of frequency $f_2$ without going through the intermediate step of generating $f_1$.

The $f_2$ modulated signal is then amplified by a Power Amplifier (PA) 585 and fed to a frequency or time duplexer 587. This amplifier 585 (and the corresponding amplifier 527 in the slave 510 that drives the small high frequency (HF) antenna 535 for internal communication) does not have to be high power compared to amplifier 595 because amplifier 585 has to cover the smaller distance between the master and the slave (compared to the longer distance between the slave and the external device 520). For example, the power of amplifier 585 (and 527) is typically of the order of milli-Watts while the power of amplifier 595 is 100-1000 times more and is of the order of Watts. Both amplifiers, however, have power control and change their gains accordingly. The duplexer 587 connects the PA's output signal to the small high frequency antenna 530 during transmission so that the antenna 530 radiates the modulated RF signal over the airwaves to a receiver (e.g. the slave 510 in the figure) or a set of receivers.

The small high frequency antenna 535 of the slave 510 receives the RF modulated carrier signal of frequency $f_2$ and the duplexer 589 connects the antenna 535 to a Low Noise Amplifier (LNA) 590. The LNA 590 amplifies this signal and feeds it to a down-converter mixer 550. A clock 592 and a Phase Lock Loop (PLL) synthesizer 594 are used to generate an RF signal of frequency $f_1$ which is the transmit carrier of the target external device 520 or devices. The down-converter mixer 550 down-converts the signal to frequency $f_1$ by mixing it with this RF generated signal, and the resulting signal is then amplified by a Power Amplifier (PA) 595 and fed to a frequency or time duplexer 596. The duplexer 596 connects the PA's output signal to the larger antenna 540 during transmission so that the antenna 540 radiates the $f_1$ modulated RF signal over the airwaves to a receiver (e.g. the external device 520) or a set of receivers. In the embodiments that the duplexers in FIG. 5 are time duplexers they need the control channel 555 to set the switch to receive or transmit. FIG. 5 shows the same $f_2$ frequency for transmission from the master to the slave and transmission from the slave to the master. However, some embodiments use different frequencies for the two directions. If the transmit and receive frequencies are different then the duplexer does not have to be time-multiplexed and can instead use filters to filter out the frequencies.

The external device 520 uses the slave 510 to transmit to the master 505. The large antenna 540 of the slave 510 receives the RF modulated carrier signal of frequency $f_1$ that originates from the antenna 598 of the external device 520. The slave's duplexer 596 connects the large antenna 540 to a Low Noise Amplifier (LNA) 542. The LNA 542 amplifies this signal and feeds it to an $f_2$ up-converter mixer 545. A clock 547 and a Phase Lock Loop (PLL) synthesizer 549 are used to generate an RF signal of the same $f_2$ frequency as the transmit carrier.

The up-converter mixer 545 up-converts the signal by mixing it with this RF generated signal. The up-converted signal is amplified by a Power Amplifier (PA) 527 and fed to a frequency or time duplexer 589. The duplexer 589 connects the PA's output signal to the small high frequency antenna 535 during transmission so that the antenna radiates the modulated RF signal over the airwaves to a receiver (e.g. the master 505) or a set of receivers. The small high frequency antenna 530 of the master device 505 receives the RF modulated carrier signal of frequency $f_2$ and its duplexer 587 connects the antenna 530 to a Low Noise Amplifier (LNA) 517. The LNA amplifies this signal and feeds it to a down-converter mixer 522. A clock 524 and a Phase Lock Loop (PLL) 526 synthesizer are used to generate an RF signal of frequency $f_2$. The down-converter mixer 522 down-converts the signal to frequency $f_1$ by mixing it with this RF generated signal. Another clock 528 and another Phase Lock Loop (PLL) synthesizer 529 are used to generate an RF signal of frequency $f_1$, which is mixed by the down-converter mixer 534 with the down-converted signal to down-convert the signal further for the receiver (Rx) 551.

In other embodiments the two sets of down-converter mixers 522 and 534 and their associated clock and PLL can be combined into one set without going through the intermediate step of generating an $f_1$ down-converted signal. Also, FIG. 5 shows two clocks in the slave and four clocks in the master for frequency conversion. However, the same clock can be used for the opposite directions of transmit and receive if the frequencies are the same, so the slave in some embodiments has just one clock and the master has two clocks (in some embodiments that frequency conversion in the master bypasses the intermediate $f_1$ and goes directly to $f_2$, the master has just one clock). The receiver 551 performs analog gain control, filtering and feeds the signal to its Analog to Digital Convertor (ADC) for digital conversion. Receiver 551 in some embodiments also performs some digital demodulation before sending the signal to the digital baseband. The digital baseband 525 then processes the digital signal to extract the data bits and provide them to other components that are not shown such as a processing unit, DSP, and/or memory.

FIG. 6 conceptually illustrates the architecture of a distributed communication device of some embodiments of the invention where the slave 610 has additional functionality compared to FIG. 5. In particular, the slave has most or all the physical layers to do digital modulation, demodulation and coding. This is performed in the slave radio modem 615. In FIG. 6 the slave's radio modem includes a simpler DSP and/or processor and memory. The slave's radio modem 615 is between two sets of mixers 620 and 625 which change the carrier frequency before and after the slave's modem 615. However, changing the carrier frequency has no effect on the digital modulation and coding; it merely changes the carrier frequency over the airwaves.

Unlike, FIG. 5 where all the digital modulation and coding was performed in the master, in FIG. 6 digital modulation and coding is distributed between the master and the slave. For example, when the master is transmitting, the master's digital baseband 630 and transmitter Tx 635 may perform some digital modulation and coding, but the slave's radio modem performs the bulk of digital modulation and coding. Consider the case where the master is using the slave to transmit to an external device that has an 802.11 transceiver. The master may perform a limited amount of digital coding and modulation, but the slave's modem performs most of the digital coding, digital modulation, data framing, data formatting and data packetization for the 802.11 standard. The slave's modem in some embodiments also performs digital demodulation, coding, and modulation between two standards (e.g. 60 HGz standard and WLAN 802.11 standard operating with carrier frequency 2.4 GHz, 3.6 GHz or 5 GHz). Thus, if the master has performed digital coding and modulation for a different standard than the one that the external device supports or requests then the slave can demodulate and decode the data it receives from the master, and perform the correct digital coding and digital modulation for the slave's standard.

Figure 19:
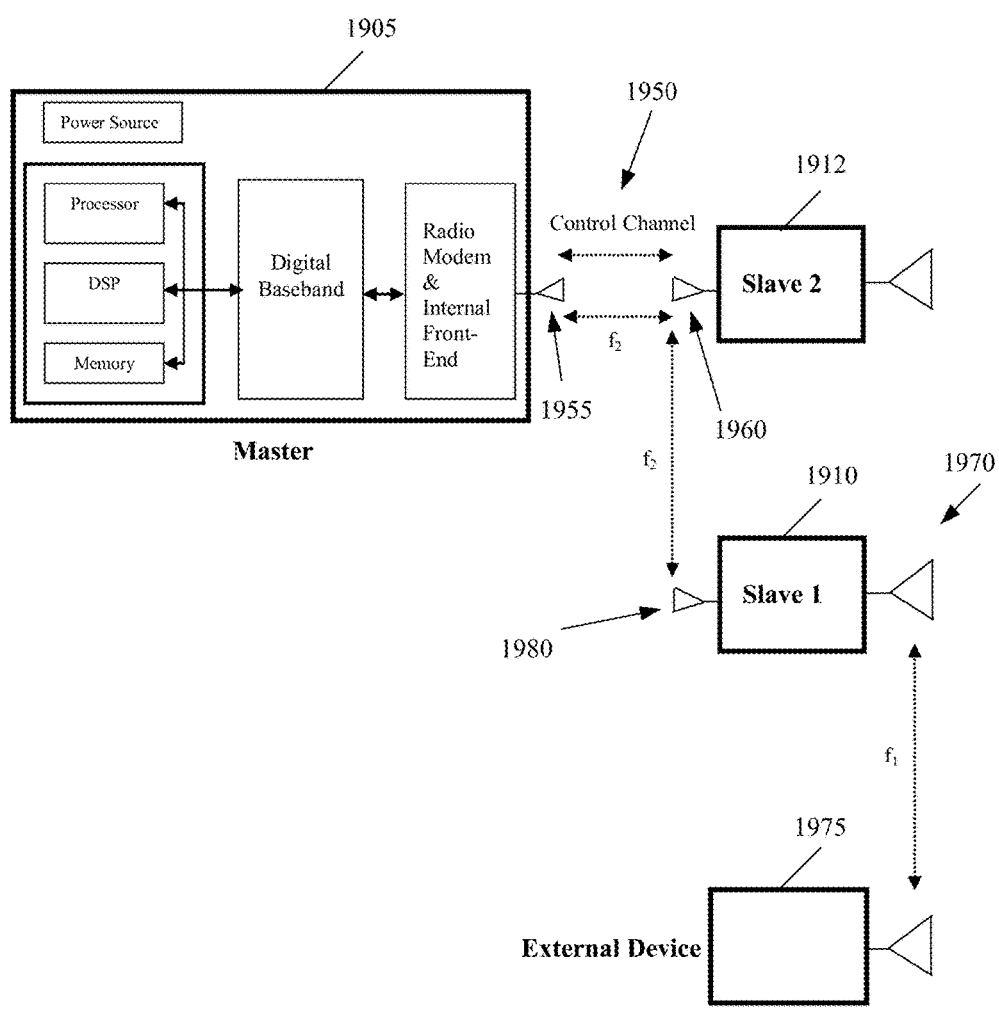
FIG. 19 conceptually illustrates a distributed communication device of some embodiments of the invention where a master uses more than one slave to communicate with an external device.

Slave 610 is also capable of communicating with another slave if instructed with the master's control channel to do so because slave 610 has memory and processing power in 615. In this embodiment the slaves' antennas and modems are bi-directional and can use time duplexing to transmit and receive over the same HF antenna if necessary. FIG. 19 conceptually illustrates a distributed communication device of some embodiments where a master uses more than one slave to communicate with an external device. The figure shows a master 1905 that has performed digital modulation, coding and data formatting for a Wi-Fi (802.11) transmission to an external device 1975 and wants to use a first slave as an intermediary in between the two. However, first slave 1910 is not addressable by master 1905 because it is too distant or because there is an obstacle in between the two. Master 1905 then uses its control channel 1950 to address and activate a second slave 1912 which is near the first slave 1910 and can communicate with it.

The master uses the higher carrier frequency $f_2$ and its HF antenna 1955 and transmits the data to the second slave's HF antenna 1960. The second slave's HF antenna 1960 receives the control signals and the data from the master 1905 and sends them to the second slave's radio modem (e.g., radio modem 615 shown in FIG. 6). The second slave's radio modem 615 then uses time duplexing and its HF antenna 1960 to re-transmit the data to the first slave's HF antenna 1980. The first slave 1910 then receives the information from the second slave 1912 and uses frequency shifting to the lower $f_1$ frequency and its larger antenna 1970 to make a Wi-Fi (802.11) transmission to the external device 1975. Although FIG. 19 shows two slave used as intermediary between the master 1905 and the external device 1975, master 1905 in some embodiments uses more than two slaves as intermediary where the extra intermediary slaves communicates with each other in a chain. Such a chain can in some embodiments resemble an ad-hoc or mesh network.

In other embodiments, the first and/or the second slave perform in a distributed fashion some or all of the digital coding, modulation and data framing and formatting for the external device transmission standard (e.g. CDMA, or in this example 802.11). Thus, the slave functionality in FIG. 6 is more than the carrier frequency converter of FIG. 5.

C. Distributed Communication Device with Components that Include Multiple Antennas In the embodiments described by reference to FIGS. 4-6, a single antenna in the master internally communicates with a single antenna on the slave and a single external antenna on the slave communicates with a single antenna on an external device. Multiple antenna systems however improve communication performance with beam-forming, spatial multiplexing, and diversity coding.

With single layer beam-forming, the same signal is transmitted from the transmitter's antennas with different phase and gain settings so that the signals sum constructively at the receiver. This maximizes the received power at the receiver and improves the gain. Beam-forming works well for small delays. If the receiver has multiple antennas, and there is knowledge of the channel state information at the transmitter, then pre-coding with multiple streams is used.

With spatial multiplexing, a signal is divided into several lower rate streams and each stream is transmitted from a different transmit antenna in the same frequency channel. This increases channel capacity at higher signal to noise ratios (SNR). The maximum number of streams is limited by the number of antennas at the transmitter and the receiver.

Diversity coding is a technique that is used in Multiple Input Multiple Output (MIMO) wireless systems when there is no knowledge of the channel at the transmitter. With diversity coding a single stream is transmitted but the signal is coded using methods such as space-time coding and is transmitted from each antenna with full or near orthogonal coding. Diversity coding takes advantage of the independent fading characteristics of the multiple antenna signal paths and provides better diversity for larger separation distances between the antennas. Spatial multiplexing can also be combined with pre-coding when the transmitter's channel is known or combined with diversity coding. These techniques are applicable to different embodiments of the invention for communication between the master and the slave and communication between the slave and external devices.

i. Components with Multiple Internal Antennas

Figure 7:
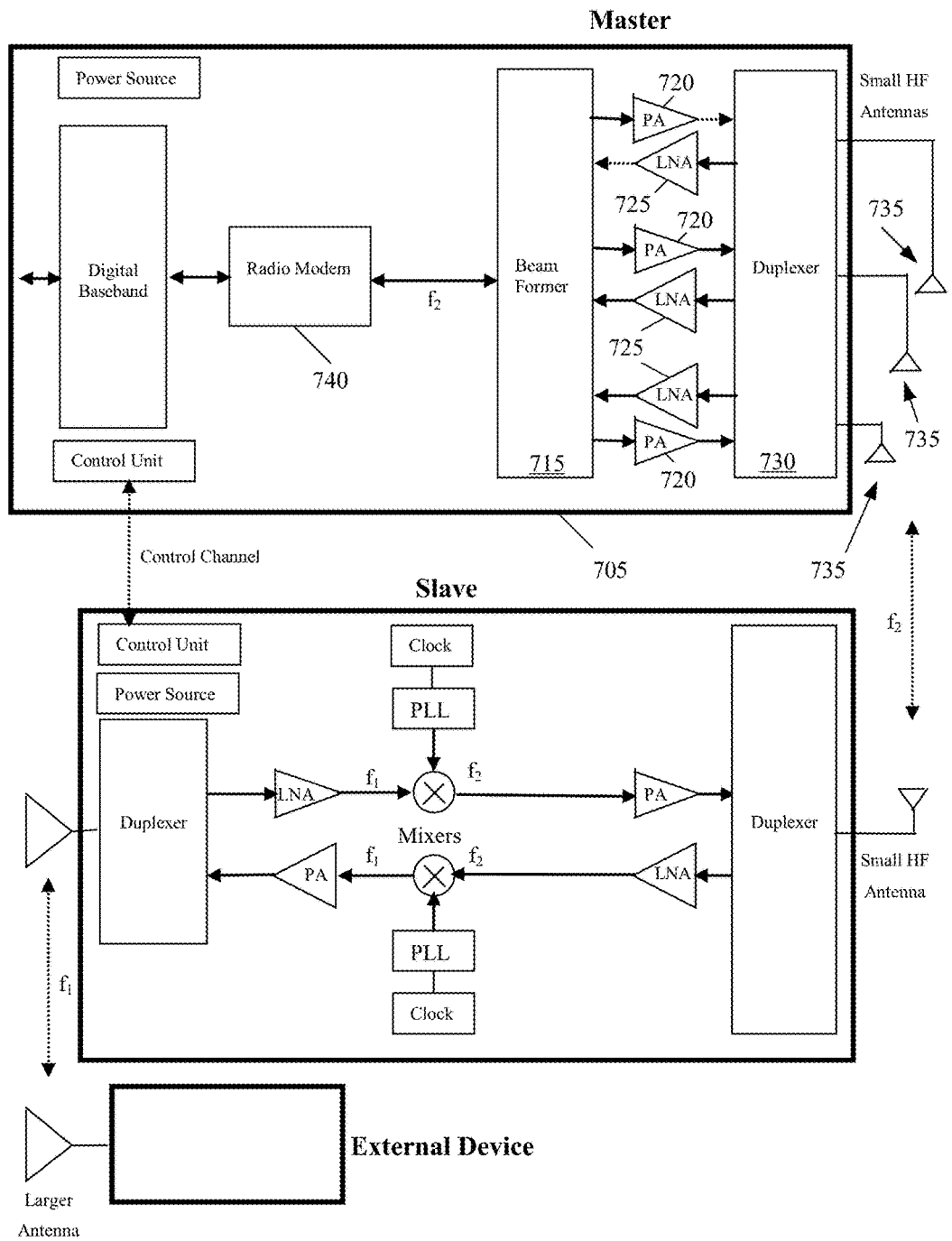
FIG. 7 conceptually illustrates the architecture of a distributed wireless communication device of some embodiments of the invention where only the master has beam steering capability with multiple small HF antennas.
Figure 8:
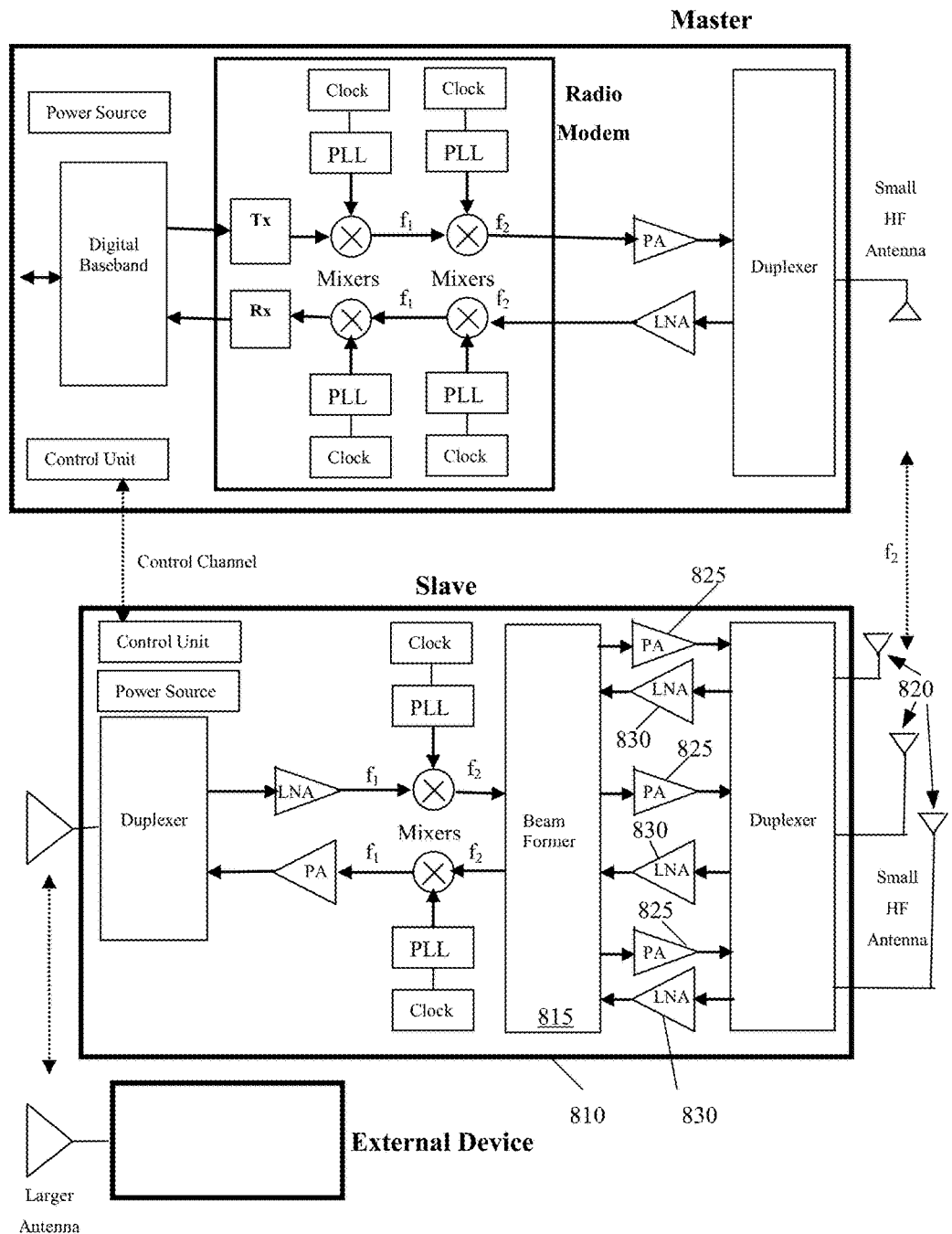
FIG. 8 conceptually illustrates the architecture of a distributed wireless communication device in some embodiments of the invention where only the slave has multiple small HF antennas for internal communication between the slave and the master.
Figure 9:
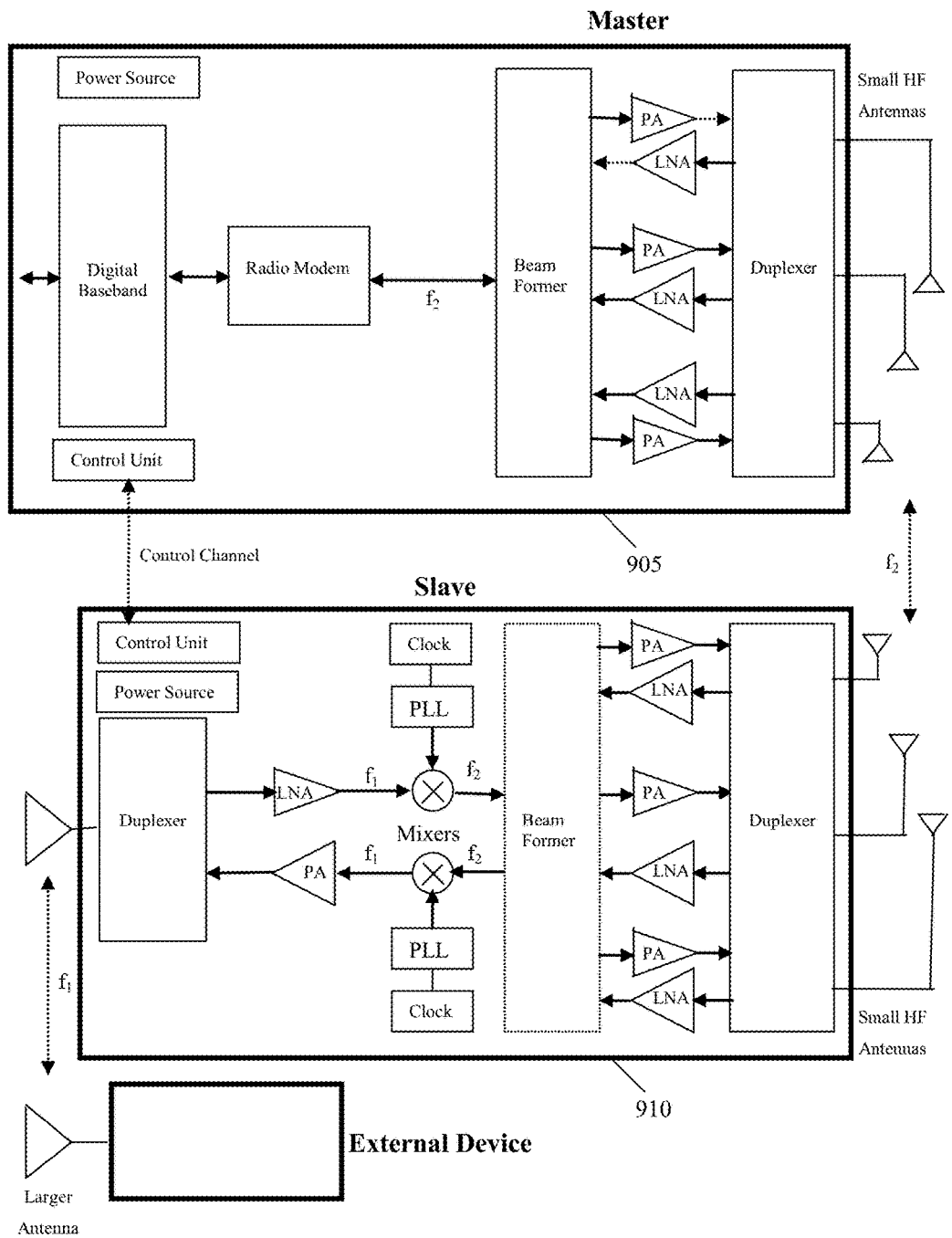
FIG. 9 conceptually illustrates the architecture of the distributed wireless communication device of some embodiments of the invention with multiple master and slave small HF antennas for internal communication between the master and the slave.

FIGS. 7-9 show different multi-antenna configurations for the internal communication between the master and the slave. Different components or modules of the master and the slave in these figures are described in the following paragraphs. FIG. 7 conceptually illustrates the architecture of a distributed wireless communication device of some embodiments of the invention where only the master has beam steering (or beam-forming) capability with multiple small HF antennas. Three small HF antennas are shown in this example but the number in different embodiments is 2 or more. In FIG. 7 each antenna 735 is shown as having its own PA 720 and LNA 725. The master 705 has a beam-forming unit 715 that is placed before the PA 720 and duplexer 730 on the transmit side or after the duplexer 730 and LNA 725 on the receive side. In other implementations, however, the beam-forming unit 715 is placed on the other side of the duplexer.

The beam-former 715 generates different phase and amplitudes for each of the antennas 735 in order to steer the beam. Likewise, on the receive side the beam-former 715 takes multiple receive signals from each antenna 735 and combines them with multiple phases/amplitudes. The output of the beam-former 715 results in one communication channel, and hence the antennas share one radio modem 740 (the components of which are shown in FIG. 5).

In yet other embodiments, there is no explicit beam-forming component in the master, and the beam-forming function is integrated into the radio modem's transmitter (Tx) and radio modem's receiver (Rx) where they generate the phase, and amplitudes for beam-forming (TX and RX components are shown in FIGS. 5 and 6). The transmitter's beam-former, if it has one, steers and focuses the energy of the transmitted beam on the antenna(s) of the receiver (e.g. in FIG. 7 beam-former 715 focuses the energy of beam from antennas 735 on the small HF antenna of the slave) for optimum power transfer, while the receiver's beam-former, if it has one, uses phase shifting information to sum the power from each antenna coherently (e.g. in FIG. 8 beam-former 815 uses phase shifting to sum the power from small HF antennas 820 coherently). Since noise is uncorrelated this increases the gain and Signal to Noise Ratio (SNR).

FIG. 8 conceptually illustrates the architecture of a distributed wireless communication device in some embodiments of the invention where only the slave has multiple small HF antennas for internal communication between the slave and the master. As shown, the slave 810 has beam steering capability with a beam-forming unit 815 and multiple small HF antennas 820 that have their own PAs 825 and LNAs 830. FIG. 9 conceptually illustrates the architecture of the distributed wireless communication device of some embodiments of the invention with multiple master and slave small HF antennas for internal communication between the master and the slave. As shown, both the master 905 and the slave 910 have multiple antennas with beam steering capabilities. The discussions about other embodiments for FIG. 7 also apply to FIGS. 8 and 9. As with FIG. 7, in FIGS. 8 and 9 the beam-former results in one communication channel.

ii. Slave Components with Multiple External Antennas

Figure 10:
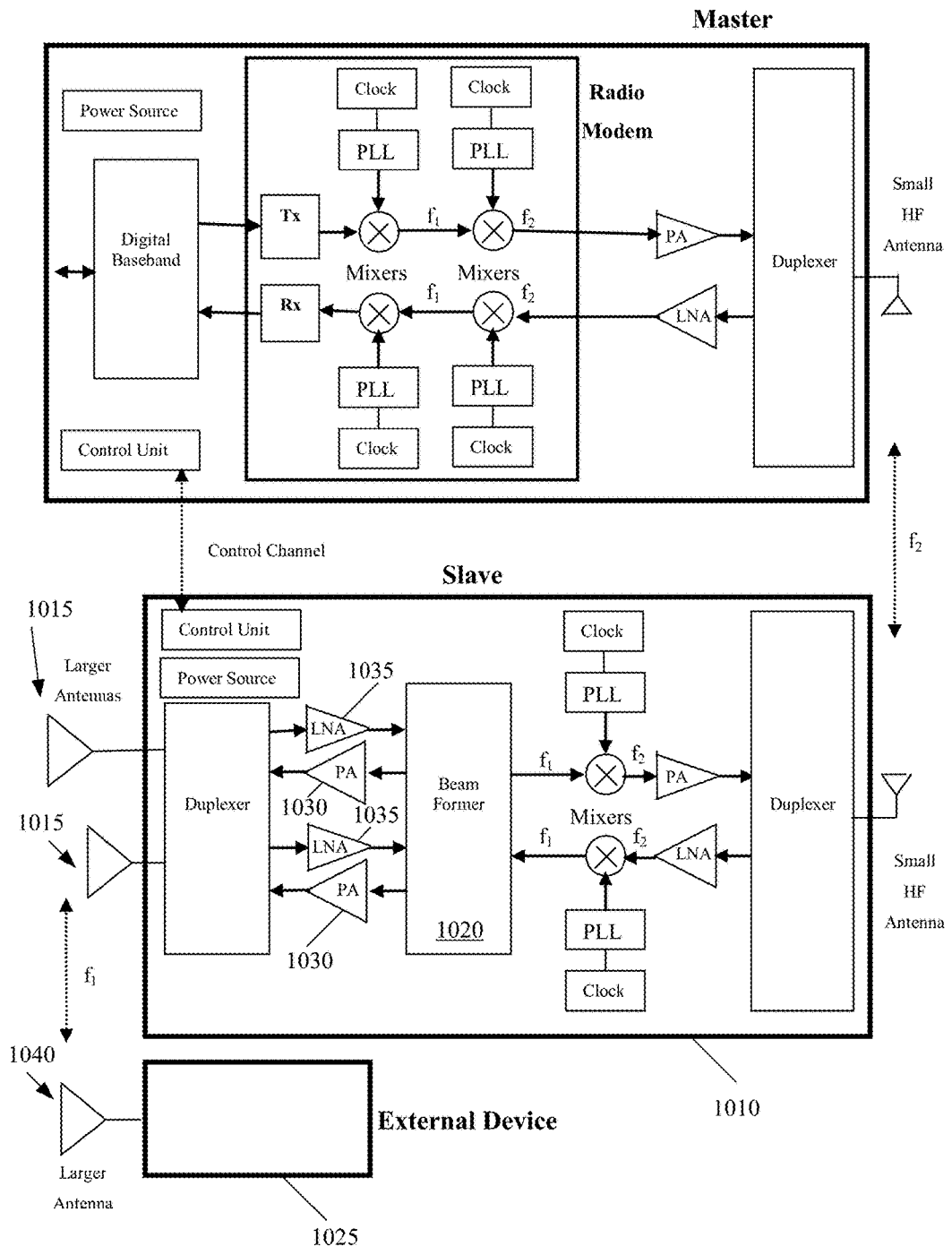
FIG. 10 conceptually illustrates the architecture of a distributed wireless communication device of some embodiments of the invention with the slaves having multiple external communication antennas for communication and beam forming between the slave and the external device.

Multiple antennas may also be used for external communication between the slave and external devices such as the external device labeled in FIGS. 4-9. FIG. 10 conceptually illustrates the architecture of a distributed wireless communication device of some embodiments of the invention with the slaves having multiple external communication antennas for communication and beam forming between the slave and the external device. As shown, the slave 1010 has multiple large external antennas 1015 (two are shown but the number can be larger) and a beam former 1020 that is used to communicate with the external device 1025. Each of the large antennas 1015 has its own PA 1030 and LNA 1035. The use of beam-forming just makes the effective antenna size bigger but there is one communication channel between the slave and the external device. Although the external device 1025 is shown as having one antenna 1040, in other embodiments the external device 1025 also has multiple antennas for communicating with the slave 1010. Alternative embodiments of FIG. 10 use multiple antennas for internal communication between the slave and the master, as shown in FIGS. 7-9. In yet other alternative embodiments, a master can communicate with multiple slaves where delays are used for each slave so that multiple slaves beam-form when communicating with the external device. An example of these embodiments is described by reference to FIG. 14, below.

iii. Slaves with MIMO Implementation

Figure 11:
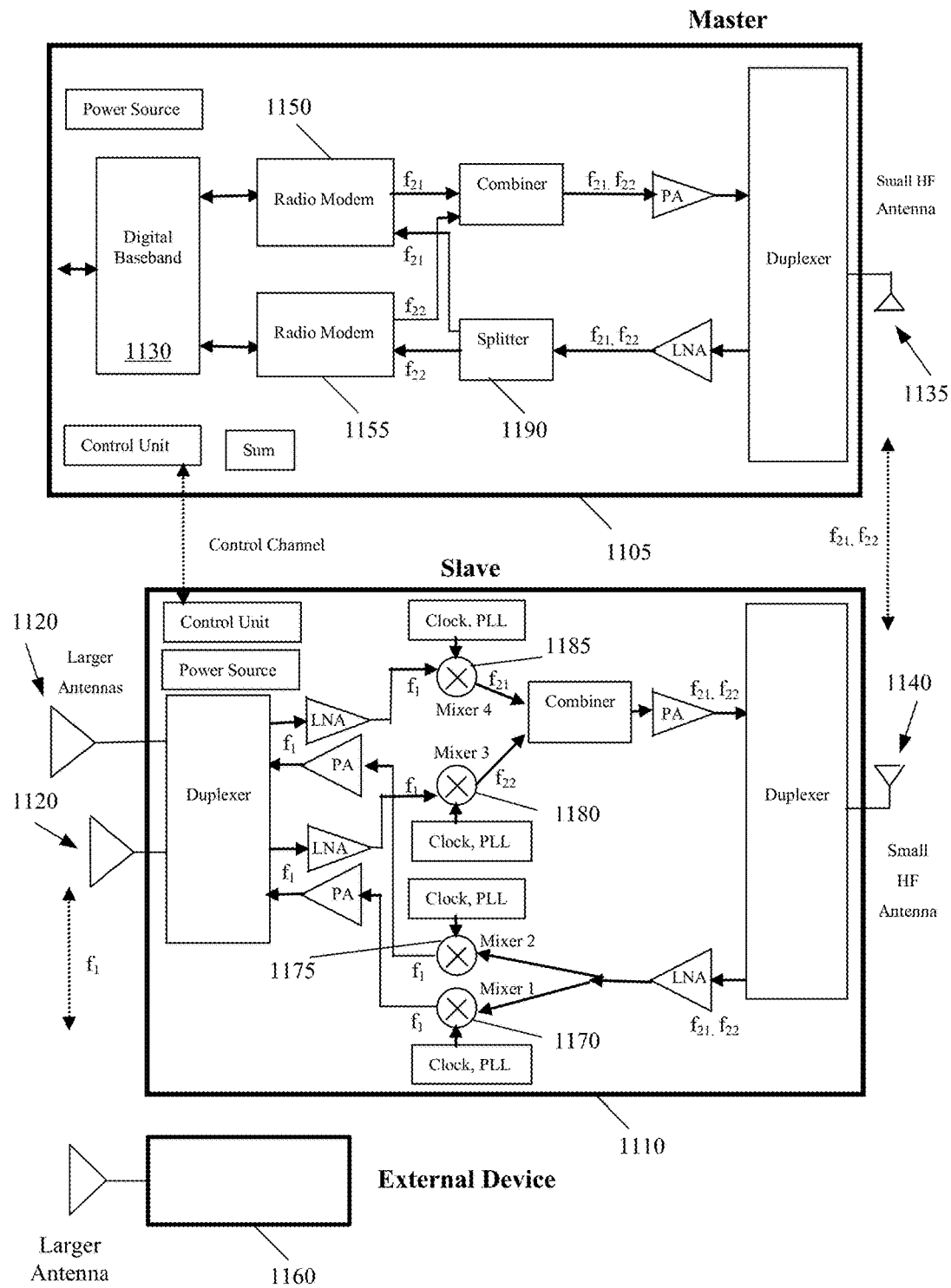
FIG. 11 conceptually illustrates the architecture of the distributed wireless communication device of some embodiments of the invention with the slave having multiple external communication antennas together with a MIMO implementation.
Figure 12A:
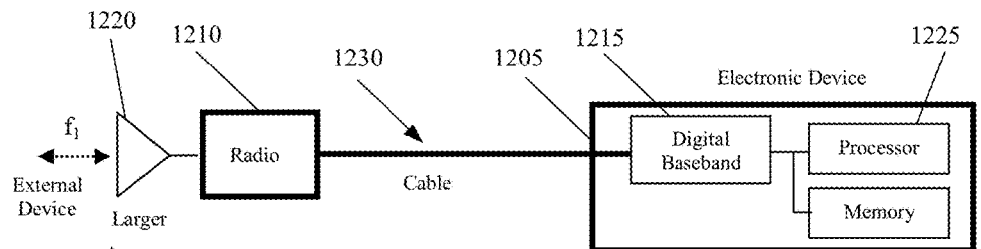
FIGS. 12(a)-12(d) conceptually illustrate four different methods in some embodiments of the invention for placing an electronic device's radio antenna at a distant location from the device such that the device can communicate with external devices.
Figure 12B:
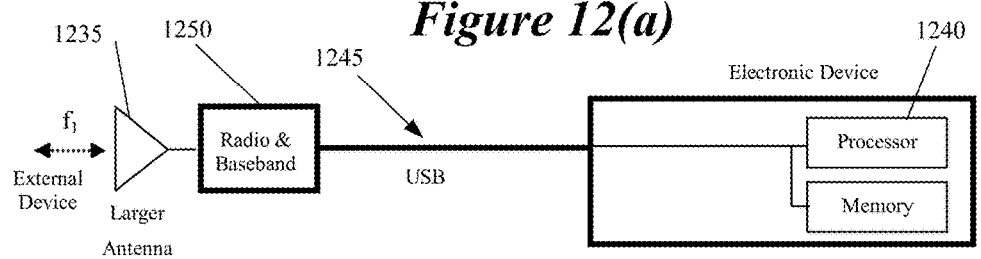
Figure 12C:
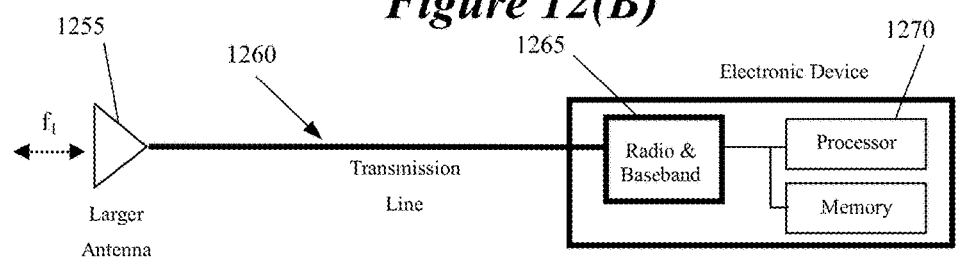
Figure 12D:
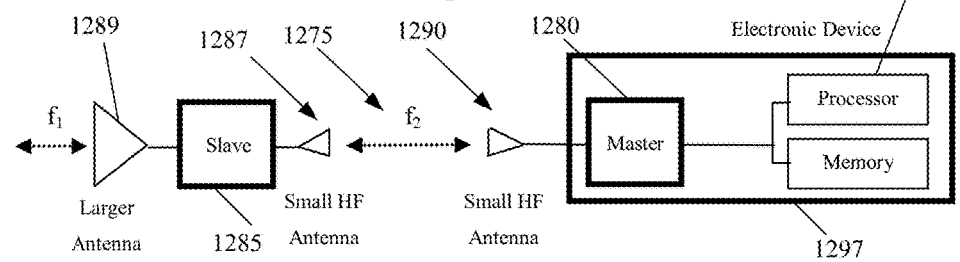

FIG. 11 conceptually illustrates the architecture of the distributed wireless communication device of some embodiments of the invention with the slave having multiple external communication antennas together with a MIMO implementation. As shown, the slave 1110 has multiple external communication antennas 1120 together with a MIMO implementation, where each external antenna 1120 has its own communication channel. Only two external antennas 1120 for the slave 1110 are shown but it can also be any number greater than two. In this figure the master 1105 is exploiting the diversity of the slave's two external antennas 1120 by implementing space-time coding or some other MIMO method in its baseband 1130.

The master 1105 and the slave 1110 of FIG. 11 have only one internal antenna 1135 and 1140, respectively. There are different methods to implement the two channels with this one internal antenna configuration. These include having different frequencies for each channel, using spread spectrum where each channel is spread differentially, or time multiplexing between the two channels. FIG. 11 shows the master 1105 using two different frequencies, $f_{21}$ and $f_{22}$. Thus on transmission from the master 1105, the master uses a separate modem 1150 and 1155 for each antenna channel (two in this example), and their output is combined and transmitted to the slave 1110 using the single internal antenna 1135. The slave 1110 then uses two mixers (mixer 1 and mixer 2, each with a different clock) 1170 and 1175 to separate the two signals and feed them to the two antennas 1120 for transmission to the external device 1160. When the external antennas 1120 of the slave 1110 receive from the external device 1160, the slave 1110 uses two mixers (mixer 3 and mixer 4) 1180 and 1185 to convert their $f_1$ frequency signals to two different frequencies, $f_{21}$ and $f_{22}$, before combining them and transmitting them to the master 1105. The master 1105 then uses a splitter 1190 (which could be just wires) to separate the two signals for the modems 1150 and 1155 prior to baseband processing. In some alternative embodiments, the slave also has a signal processor for demodulating, decoding, coding, modulating, and reformatting between two different wireless standards.

D. Different Placements for Antennas

FIGS. 12(*a*)-12(*d*) conceptually illustrate four different methods in some embodiments of the invention for placing an electronic device's radio antenna at a distant location from the device such that the device can communicate with external devices. Examples of this device are a PC, laptop, television set or set-top box. It is desirable to have the antennas near the edges of the display screen or behind the display screen to improve sensitivity and performance. For example, for a Digital TV it is better to have the antennas near the edges of the display or behind the display screen than on circuit boards near the processor of the TV. This is because there is more interference with other circuit components if the antennas are near them. There is also less space on circuit boards for the antennas in terms of optimally laying them out and orienting them. These same arguments are also true for other electronic devices such as a laptop, where it is better to have the antennas near the edges of the display screen or behind the display screen rather than the circuitry under the keyboard. If the antenna is near the edges of the device or its display screen then there is a need for a high-speed connection between the antenna and the rest of the circuitry.

As shown in FIG. 12(*a*), the electronic device 1205 has a radio 1210, baseband 1215 and large antenna 1220 for wireless communication, but the antenna 1220 and radio 1210 are not physically close to the baseband 1215 and the processor 1225 of the device and a cable 1230 is used to connect them. In FIG. 12(*b*), the antenna 1235, radio and baseband (shown together 1250) are distant to the electronic device's processor 1240 and a USB cable 1245 is used to connect them.

In FIG. 12(*c*), the antenna 1255 is distant to the radio, baseband (shown together 1265) and electronic device's processor 1270 and a transmission line 1260 is used to connect to the antenna to the radio. One disadvantage of FIG. 12(*c*) is that because the antenna 1260 and the radio's front-end are far apart there can be a large loss between the two. The cable solution of FIG. 12(*a*) is the cheapest solution and the transmission line configuration of FIG. 12(*c*) is the most expensive.

FIGS. 12(*a*)-12(*c*) are wired connectivity solutions. In some situations it is desirable to replace these wired connectivity solutions with a high-speed wireless connectivity solution. FIG. 12(*d*) shows the embodiments that replace these wires with a high frequency wireless connection 1275 between a master 1280 and a slave 1285. Thus, the master and its small antenna 1290 are close to the processor 1295 of the electronic device 1297, whereas the slave 1285 is further away. The master 1280 communicates wirelessly with distant devices that use frequency $f_1$ (e.g. 802.11* Wireless LAN 2.4 GHz, 3.6 GHz, 5 GHz, Bluetooth®'s 2.4 GHz ISM band, etc.) by using the slave 1285 as an intermediary. The small antenna 1290 of the master 1280 uses high frequency $f_2$ (e.g. 60 GHz, 100 GHz, or any other high frequency) to communicate internally with the small antenna 1287 of the slave 1285. In different embodiments, the master 1280 includes some or all components of the masters described by reference to FIGS. 4-11, above. Similarly, in different embodiments, the slave 1285 includes some or all components of the slaves described by reference to FIGS. 4-11, above.

The slave 1285 then uses its larger antenna 1289 to communicate externally with the external device (not shown) using the lower $f_1$ frequency. The slave 1285 places the large antenna 1289 next to the front-end part of the radio (which is included in the slave) that drives the antenna and hence minimizes the loss that can occur between the two.

The master 1297, the slave 1285, or both can optionally have multiple internal antennas with beam steering as was shown in FIGS. 7-9. The slave 1285 in some embodiments also has multiple large external antennas for beam-forming (as described above by reference to FIG. 10) or MIMO (as described above by reference to FIG. 11). The master in some embodiments also communicates with multiple slaves at the same time to do beam-forming for communication between the slaves and external devices (as described below by reference to FIG. 14) and MIMO (as described below by reference to FIG. 15).

II. Examples of Different Applications of a Distributed Communication System

A. Facilitating Communication of an Electronic Device with External Devices

Figure 13:
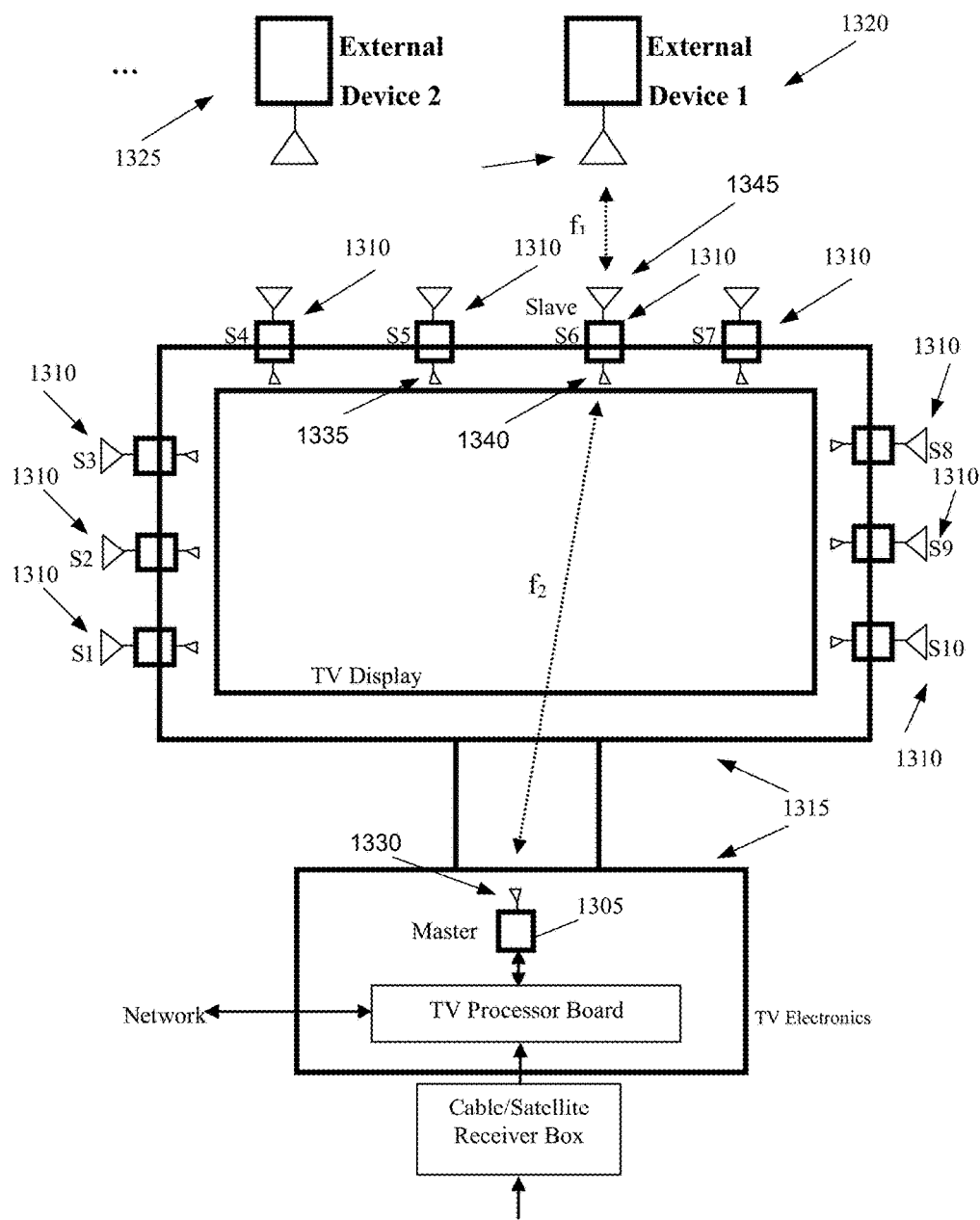
FIG. 13 conceptually illustrates an electronic device of some embodiments of the invention that uses the system shown in FIG. 12(d) for wireless communication with external devices.

FIG. 13 conceptually illustrates an electronic device of some embodiments of the invention that uses the system shown in FIG. 12(*d*) for wireless communication with external devices. In FIG. 13, an electronic device (such as a TV) has slaves with external antennas placed at optimal locations for wireless connectivity with external devices. As shown, one master 1305 is controlling one or more slaves 1310 out of a matrix of slaves that are placed at optimal locations around the electronic device 1315.

The electronic device 1315 shown could for example be a TV. For simplicity, not all the components of this device are shown. For example suppose that this device includes a set-top box that supports cable, satellite, terrestrial or IP broadcasting. Then the device has a processor for digital media processing, memory (SDRAM, flash/EPROM), display, tuner and video decoder, audio codec and amplifier, video DAC and amplifier, IR decoder, etc. It also has connections for USB, RS232, Ethernet, IRDA, HDMI, 1394, 802.11*, Bluetooth® and other wireless standards. The TV electronics includes a standard processor board. The TV receives content from cable, satellite, or other networks (e.g. home network or Internet either though a wire or from a wireless router/gateway).

The electronic device 1315 can then use the master 1305 to communicate wirelessly with external devices 1320 and 1325 by using the slaves 1310 as intermediaries. Thus, the electronic device 1315 acts as a wireless router for external electronic devices 1320 and 1325 around it. Suppose that external device 1 1320 only has a wireless radio that supports standards A (e.g. Bluetooth®). The environment where external device 1 1320 and the electronic device 1315 are located may have a wireless connectivity router that supports wireless radio standard B (e.g. 802.11). But external device 1 can't use this router because it does not support standard B. The electronic device 1315 in some embodiments, however, uses slaves with different radio standards or some slaves with combo radios. Thus, the electronic device 1315 acts as a multi-standard wireless router or gateway and provides network connectivity for external devices that would otherwise not be able to connect to the network. Variations on FIG. 13 include the master communicating with several slaves and using beam-forming (as described below by reference to FIG. 14) or MIMO (as described below by reference to FIG. 15), as well as the presence of multiple masters (as described below by reference to FIGS. 14 and 15).

Figure 14:
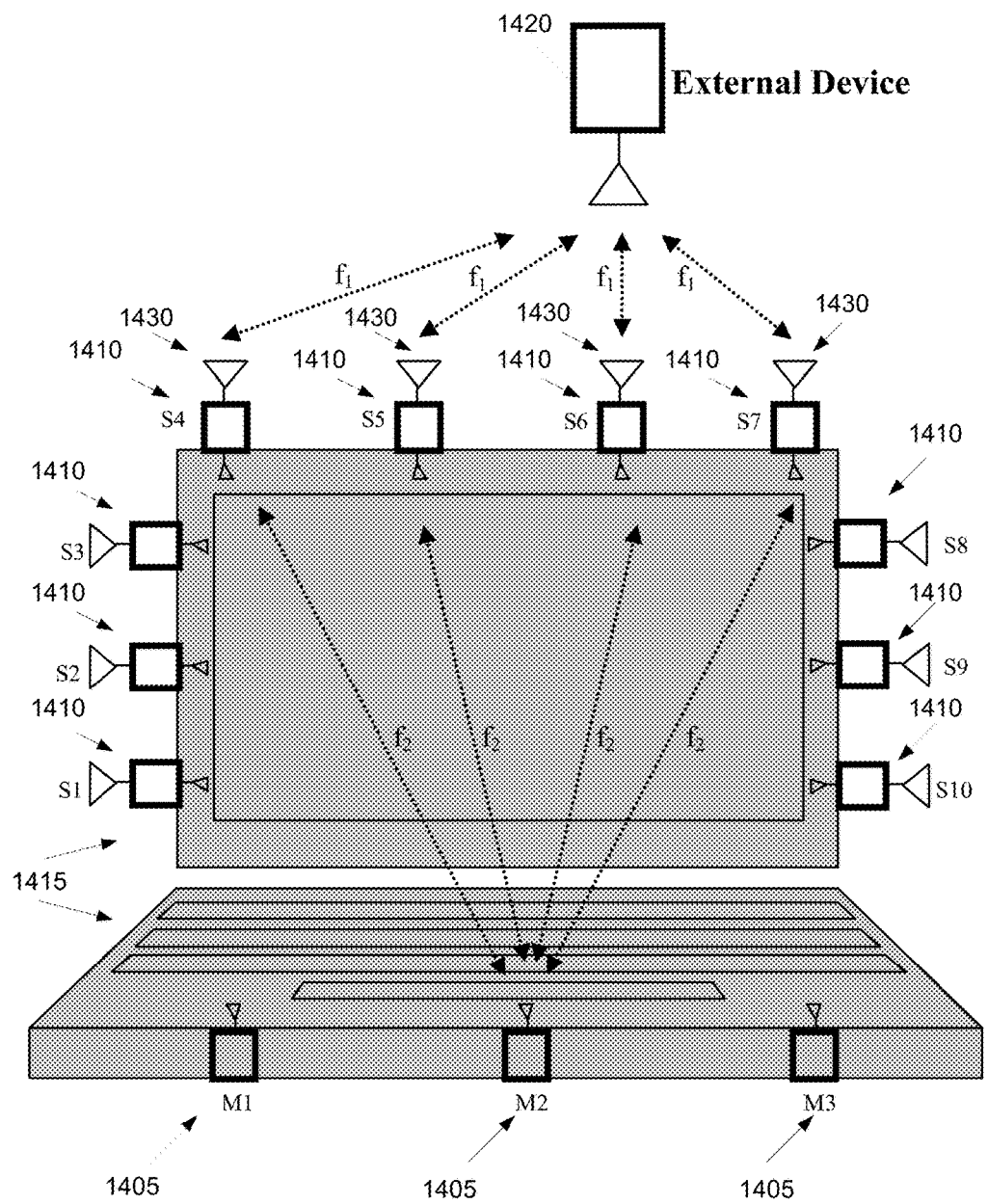
FIG. 14 conceptually illustrates a distributed communication device using beam-forming in some embodiments of the invention, where there is one effective communication channel with the external device.
Figure 15:
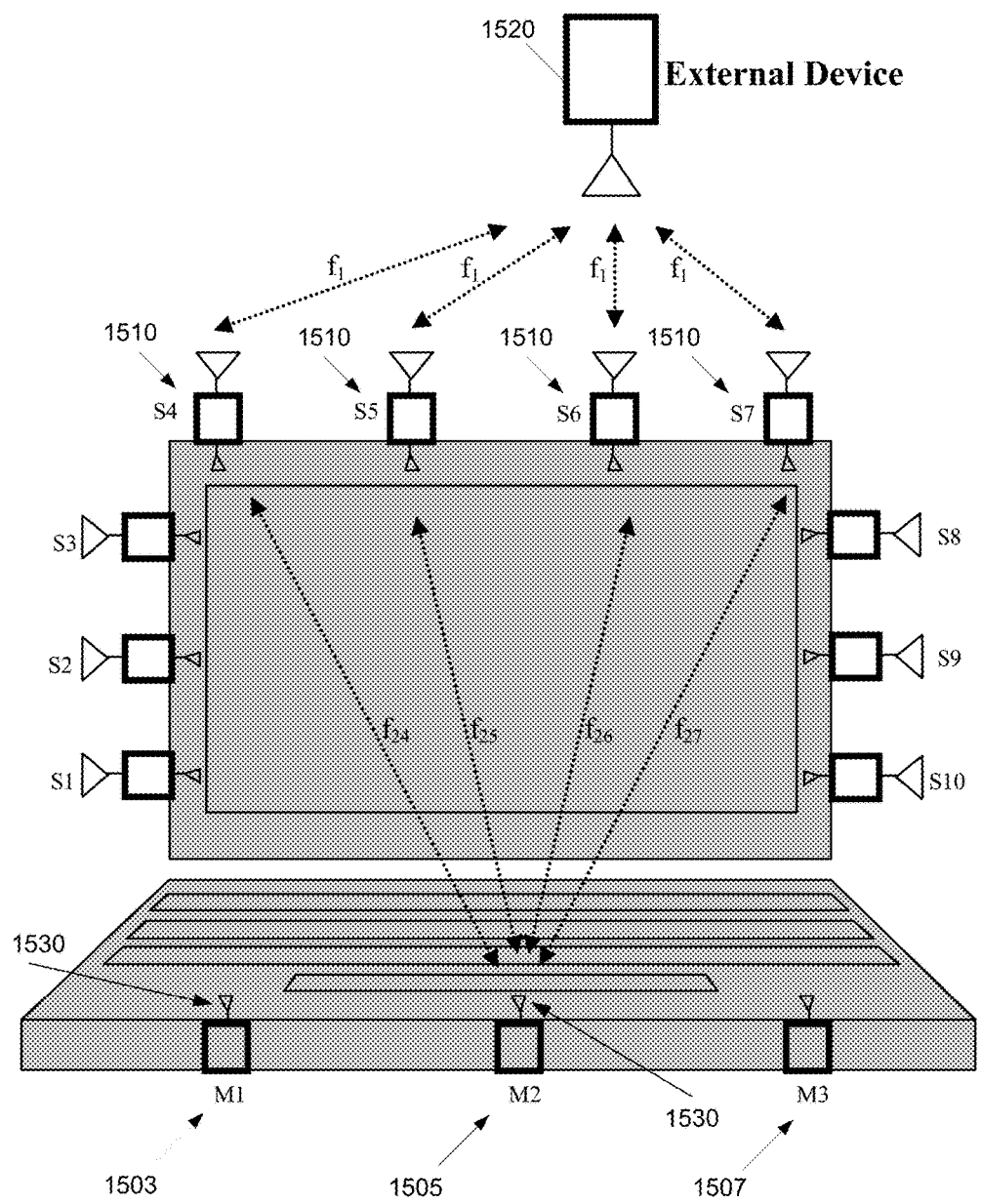
FIG. 15 conceptually illustrates a MIMO implementation of some embodiments of the invention.

In some embodiments the slave's modem supports encoding for multiple standards. In other embodiments the master addresses and activates multiple slaves (as shown in FIGS. 13-15) and each slave supports only one encoding standard or a limited number of encoding standards. Consider FIG. 13 for the latter case, where the master addresses different slaves for different standards. Each slave (and master) has an address and the master uses control signals on the control channel to activate a particular slave. The packets that are transmitted over the air also have the address of the receiver device. For instance in FIG. 13, master 1305 may activate slave S6 for Wi-Fi (802.11) transmission to external device 1 1320, and it may activate slave S4 for Bluetooth® transmission to external device 2 1325. Here the slaves do most or all the encoding and processing for the standards. This processing is carried out in the slave's modem 615 (shown in FIG. 6).

In yet other embodiments, the slaves also communicate with each other. For instance, in FIG. 13 master 1305 requires to use slave S6 for Wi-Fi (802.11) transmission to external device 1 1320. However, if slave S6 is not addressable by master 1305 (e.g., because the slave is too distant or because there is an obstacle in between the two), the master uses its control channel to address and activate slave S5 which is near slave S6 and can communicate with it. The master uses its HF antenna 1330 and transmits the data to slave S5's HF antenna 1335.

The master also instructs slave S5 to transmit the data to slave S6. In these embodiments the slaves' antennas and modems are bi-directional and can use time duplexing to transmit and receive over the same antenna. Here slave S5's HF antenna 1335 receives the control signals and the data from the master and sends them to the slave's radio modem 615 (shown in FIG. 6). The slave's radio modem 615 then uses time duplexing and its HF antenna 1335 to re-transmit the data to slave S6's HF antenna 1340. Slave S6 then receives the information from slave S5 and uses its larger antenna 1345 to make a Wi-Fi (802.11) transmission to external device 1 1320.

B. Beam-Forming

FIG. 14 conceptually illustrates a distributed communication device using beam-forming in some embodiments of the invention, where there is one effective communication channel with the external device. Although the electronic equipment shown is a laptop computer, the invention equally applies for other devices such as a tablet, gaming device, TV display, etc.

As shown, a number of slaves 1410 are placed far apart from each other around the periphery of the device 1415, such as in the periphery of the device display for example. As shown, a number of masters 1405 are also placed on the device circuit boards. The slaves 1410 around the periphery also have more room for optimal orientation of antennas, whereas in a conventional centralized wireless system (where the modem and front-end are near each other) the processor and circuit boards of the electronic equipment would limit the possible locations and orientations for the antenna. In the example of FIG. 14, master M2 with modem component uses four slaves S4, S5, S6 and S7 with external antennas 1430 to communicate with an external device.

The master is using the same frequency $f_2$ to communicate with the slaves. There is therefore one communication channel. The master, however, performs beam-forming by changing the RF delays, phases and amplitudes for the slaves in order to maximize the signal received at the external device 1420. In other embodiments, spatial multiplexing is used where the master splits a high rate signal into multiple lower rate streams and each stream is transmitted to a different slave (e.g. S4, S5, S6, and S7) in the same $f_2$ frequency channel, and the slaves forward the streams to the external device 1420 using the same frequency $f_1$.

C. MIMO Implementation

Multiple Input Multiple Output (MIMO) wireless systems use multiple antennas and diversity coding to improve system performance. The improvements offered by MIMO are a result of antenna diversity. With diversity coding the signal is coded using space-time coding methods. These coding methods exploit the independent fading characteristics of the multiple antenna signal paths. MIMO systems also offer spatial multiplexing.

In a conventional wireless communication system as in FIG. 3, however, the front-end and the modem are close together in a single chip, and if there are multiple antennas present they are physically close together. In some embodiments of the invention, the slaves are placed further apart and hence their more distant antennas provide better diversity because of their more independent fading characteristics.

One advantage of this method is that by separating the front-end from the master, the multiple antennas of the slaves can be placed further apart and hence provide better antenna diversity since they will experience different multipath and fading characteristics. The greater distance between the antennas of the slaves means less interference between the antennas. Multipath signal interference occurs when the signals are reflected by objects around the receiver. Similar problems include shadowing and fading. Shadowing can be caused by a large obstruction that is along the main signal path between the transmitter and the receiver. Shadowing can produce amplitude and phase changes on a carrier modulated transmitted signal. Fading also describes the distortion that a carrier-modulated signal undergoes as it travels from the transmitter to the receiver. Multipath propagation is one of the main causes of fading since it results in the receiver receiving and superimposing multiple copies of the transmitted signal, each traveling along different paths and experiencing different phase shifts, attenuations and delays.

FIG. 15 conceptually illustrates a MIMO implementation of some embodiments of the invention. In these embodiments, the master's baseband uses MIMO techniques such as space-time coding and there are multiple communication channels. As shown, master M2 1505 with modem component uses four slaves 1510 (slaves labeled as S4, S5, S6, and S7) to communicate with an external device 1520. The communication between the master and the slaves, however, use different frequencies ($f_{24}$, $f_{25}$, $f_{26}$, and $f_{27}$) corresponding to different channels.

The master 1505 in some embodiments chooses which slaves and how many slaves out of the set of available slaves to use. For instance, in this example the master chooses the four slaves that provide the best antennas and performance. The master does an initial setup of relationship of antennas. The master then does space-time coding and transmits the codes to the slaves. The slaves use the same frequency $f_1$ to transmit to the external device, but each slave has a different coding. The external device 1520 then receives the information and performs space-time decoding.

In other MIMO embodiments, the slaves use different frequencies to communicate with the external device (e.g. S4, S5, S6, and S7 use $f_{14}$, $f_{15}$, $f_{16}$, and $f_{17}$, respectively). This reduces interference between the external antennas of the slaves. In these embodiments, the coding becomes space-time-frequency coding where the coding takes into account the frequency as well. In this MIMO configuration it is optional to have beam-forming between the master and each slave if multiple internal antennas are present, but there is no need for beam-forming the four slaves (S4, S5, S6, and S7) as a group to communicate with the external device. It is possible, however, to do beam-forming between individual slaves and the external device provided the individual slaves have multiple external antennas. In FIGS. 14 and 15 there are several possible modes of operation for the masters to use the slaves to communicate with one or more external device as described, below.

1. Single Master Communicates with Single Slave

In some embodiments, there are more slaves than are needed but the master can pick the slave that offers the best Bit Error Rate (BER), SNR, power consumption, or Electronic Vector Magnitude (EVM) for communicating with the external device. For example, master M2 1505 communicates with slave S6. This is just a special case of having only one antenna, but here the best antenna from a set of antennas is chosen. The communication between the slave (S6 in this example) and the external device can also use multiple antennas with beam-forming (as described by reference to FIG. 10, above) if they have multiple antennas for communicating with each other. The master can also do MIMO coding (as described by reference to FIG. 11, above).

2. Single Master Communicates with a Set of Slaves

In some embodiments, a master uses a subgroup of slaves to communicate with the external device. For example, master M2 1505 communicates with slaves S4, S5, S6 and S7 and uses beam-forming between the slaves and the external device, where their signals are combined using phase and there is one effective channel as shown in FIG. 14. FIG. 15 shows a MIMO implementation where master M2's baseband uses space-time coding to communicate with the external device to exploit the spatial diversity of the antennas of the slaves. In this example, if master M2 drives all 4 slaves at the same time then it can use a different frequency for each slave, where instead of $f_2$ being the same for all four slaves it could vary for each. For example, master M2 uses space-time coding in its baseband and $f_2$ is a different channel for each slave through the use of a different frequency, frequency hopping, PN code spread spectrum, or different data rate with multiplexing.

FIG. 15 shows the internal communication frequency between the master and the four slaves as $f_{24}$, $f_{25}$, $f_{26}$, and $f_{27}$. Master M2 1505 can switch to another group of antennas by talking to e.g., slaves S1, S2, and S3. Master M2 can also switch to slaves S8, S9 and S10. When the sub-set of slaves (e.g. S4, S5, S6, and S7) are close to each other, the master M2 in some embodiments does beam-forming for communicating over a single channel with the external device (as described by reference to FIG. 14, above). When the slaves are far apart and beam-forming is not optimal, the master in some embodiments uses space-time coding to exploit the independent fading characteristics of the distant antennas of the slaves (as described by reference to FIG. 15, above). When a slave has multiple antennas, it is possible to use beam-forming for the antennas of that slave in addition to beam-forming for the group of slaves or in addition to space-time coding.

The master in some embodiments chooses which group of slaves out of a matrix of slaves to communicate with based on a selection criteria such as optimal Bit Error Rate (BER), SNR, power consumption, or Electronic Vector Magnitude (EVM). In some embodiments, this is done dynamically, where if an obstacle is introduced between one of the slaves, then the master detects the lower performance of that slave and dynamically changes the configuration by switching to another slave. The selection criteria not only determine which slaves are selected but also determine the number of slaves that are selected in a MIMO setting. For example, if the battery level is low the master may select to use 2 slaves instead of the 4 that were used initially when battery levels were higher.

FIGS. 14 and 15 show a single HF antenna on the master and on the slave; the beam-forming that was mentioned is between the slaves and the external device. In other embodiments the master, the slave, or both can have multiple HF antennas so that it is also possible to do beam-forming between the master and the slaves, in a manner that was described in FIGS. 7, 8 and 9.

3. Multiple Masters Communicate with Different Sets of Slaves

One example of multiple masters communicating with different slaves is when master M1 1503 communicates with S1, S2 and S3; master M2 1505 communicates with S4, S5, S6, and S7; and master M3 1507 communicates with S8, S9 and S10. In another embodiment masters M1, M2 and M3 each use a different frequency to communicate with their group of slaves (i.e. the frequency $f_2$ is different for M1, M2 and M3). The same discussions in the previous section titled "Single Master Communicates with a Set of Slaves" also apply here.

In some embodiments, the slaves in FIGS. 14 and 15 use different $f_t$ frequencies and standards for communicating with external devices. For example, S4, S5, S6, and S7 can have $f_1$=2.4 GHz or 3.6 GHz or 5 GHZ for 802.11 Wireless Local Area Network (WLAN) communication with the external device, while S1, S2, and S3 can have $f_1$=60 GHz for higher frequency directional 60 GHz standards communication, and S8, S9, and S10 can have $f_t$ equal to frequencies for other standards such as cellular (second generation (2G), third generation (3G), fourth generation (4G), etc.), Bluetooth®, 802.11ac, 802.11ad, Worldwide Interoperability for Microwave Access (WiMAX), HD Radio™ and Ultra-wideband standards. In another embodiment some of the masters and slaves are combo-radios and support multiple frequencies and standards.

Figure 20:
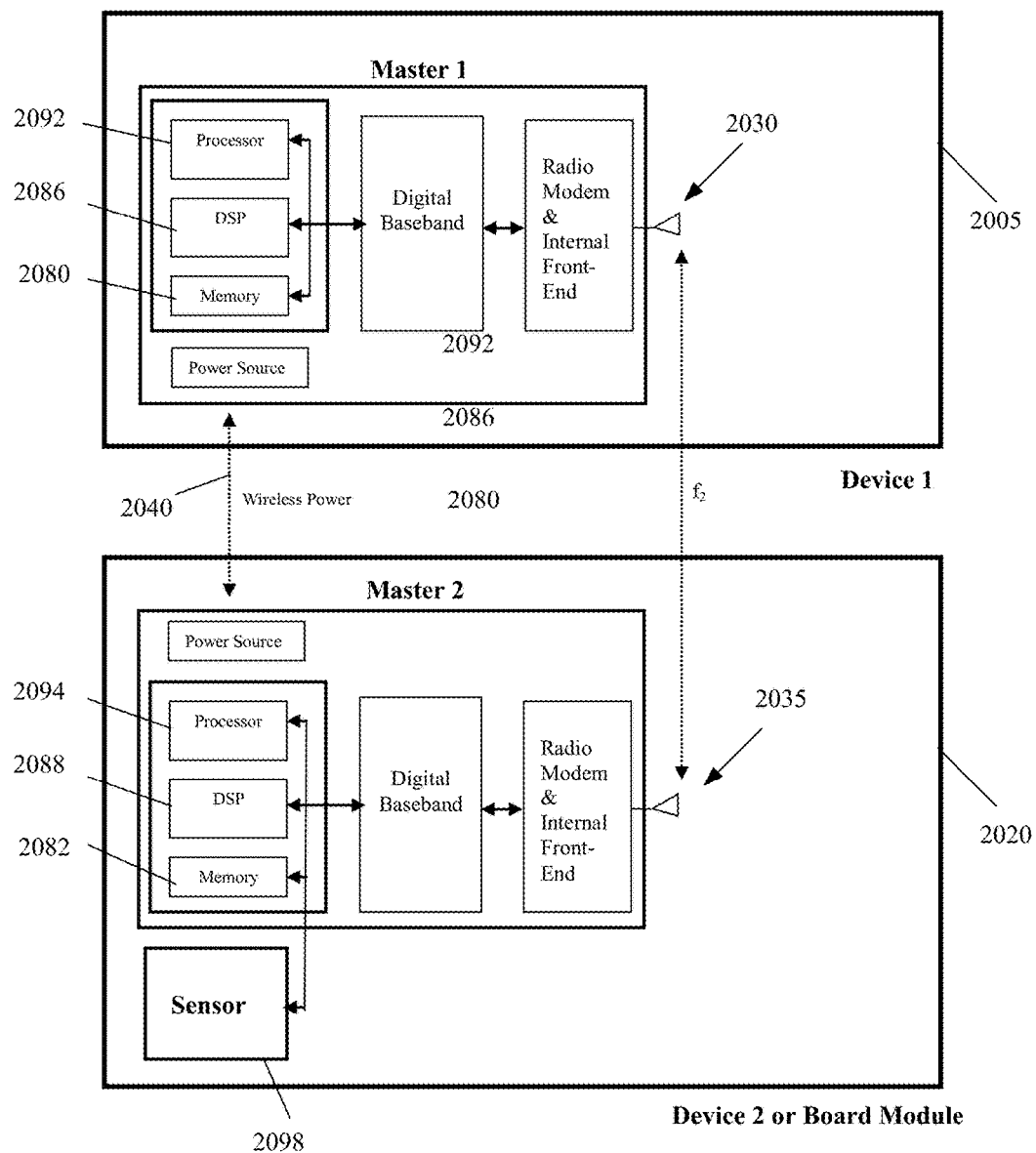
FIG. 20 conceptually illustrates two masters directly communicating with each other without using a slave as an intermediary in some embodiments of the invention.

In some embodiments, two master devices also communicate directly with each other without using slaves. For instance, in FIG. 15 Master M2 and master M1 may communicate with each other by using their small HF antennas #0530. This is possible as long as there are no obstacles between the two masters and if the two masters use enough transmission power and are within the transmission range of their HF antennas. The two masters in some embodiments are on the same board (e.g. two ICs on a board communicating wirelessly with each other) while in other embodiments each master is in different physical devices (e.g. laptop master M2 wirelessly communicating with cell phone master M1) as shown in FIG. 20. FIG. 20 conceptually illustrates two masters directly communicating with each other without using a slave as an intermediary in some embodiments of the invention. Specifically, masters 2005 and 2020 use their HF antennas 2030 and 2035 respectively to communicate with each other.

As described above, in some embodiments the master (and the slaves) operate with wireless power (RF or induction), and/or have small batteries that are rechargeable. For instance, in some embodiments a first master 2005 wirelessly powers up (as shown by double arrows 2040) a second master 2020 before communicating with the second master wirelessly directly using the HF antennas. For example, a tablet computer (e.g. iPad™) can have a first master 2005 and a cell phone (e.g. iPhone™) can have a second master 2020. When the cell phone is placed on the tablet computer the first master 2005 in the tablet computer charges the second master 2020 in the cell phone (or the tablet computer has separate a wireless charger that charges the second master) and the two masters communicate wirelessly.

The two masters 2005 and 2020 each have their own memory 2080 and 2082, DSP 2086 and 2088, and processor (or processing unit) 2092 and 2094 respectively. The two masters therefore do parallel processing in some embodiments for computational tasks and share their memory. The processor 2092 of the first master 2005 in some embodiments is separate from the processor of the tablet while in other embodiments it is the main processor of the tablet.

Likewise, the processor 2094 of the second master 2020 in some embodiments is different from the processor of the cell phone while in other embodiments it is the main processor of the cell phone. Some embodiments include a security mechanism where both masters have to be powered up and wirelessly communicating with each other in order for certain data in memory to be accessed and decoded. For example, the tablet device in some embodiments has a document, image, video, audio file, or data stored in its memory. That file can then only be accessed when the cell phone is placed near the tablet and the first master and the second master communicate wirelessly with each other. Likewise, the file may be on the cell phone's memory and it could only be accessed when the tablet is placed near the cell phone and the first master and the second master communicate wirelessly with each other. Thus, an unauthorized user would have to be in possession of both devices and have knowledge of the security mechanism to be able to view the mentioned data.

In addition to security measures this method can also be used to provide board modules that simply attach to a device, such as a laptop computer or a tablet computer, and wirelessly provide additional functionality to the device. Consider the example where the board module has a master that is attached to a sensor 2098 such as an ultrasound sensor or a Near Field Communication (NFC) transceiver. Both the master and the sensor are powered up wirelessly. This board module is then attached or placed near a computer (e.g. laptop or a tablet). The board's master and sensor receive their power wirelessly from the computer or from the computer's master (e.g. RF or induction). The board's sensor can then use the board's master to wirelessly communicate with the computer's master and provide additional functionality to the computer (e.g. ultrasound sensing or NFC reader).

Figure 16:
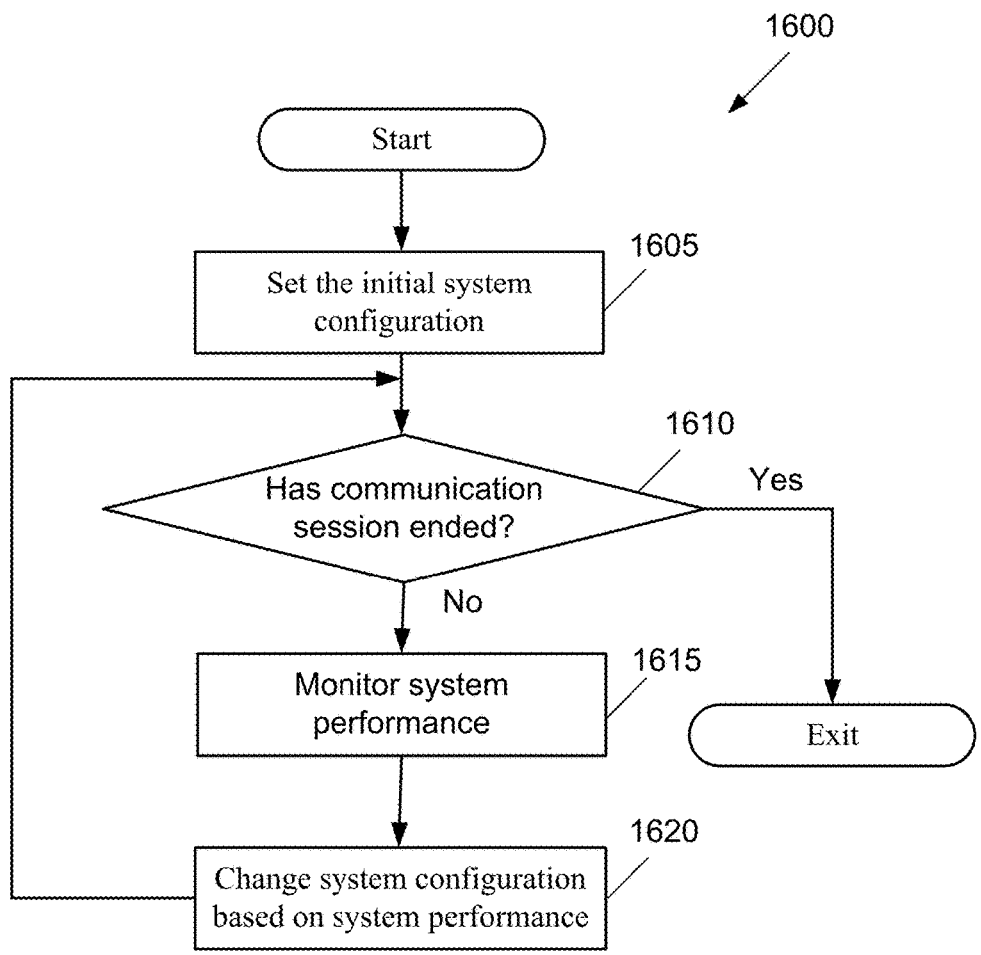
FIG. 16 conceptually illustrates a process for the master dynamically changing the system configuration to optimize system performance in some embodiments of the invention.

FIG. 16 conceptually illustrates a process 1600 for the master to dynamically change the system configuration to optimize system performance in some embodiments of the invention. As shown, the process chooses (at 1605) an initial system configuration. System configuration parameters include the number and set of active slaves, mode of the channel between the master and the slave(s) (single frequency channel, MIMO, etc.), coding for each slave if MIMO is used, beam-forming between the master and the slaves (on or off), etc.

The process then determines (at 1610) whether the communication session is finished or whether there is more data to transmit/receive. When the process determines that the session has ended, the process exits. Otherwise, the process monitors (at 1615) the system performance (e.g., by using the master's processor and baseband to monitor the performance). System performance parameters include capacity of channel between the master and the slave(s), packet error rate, Bit Error Rate (BER), feedback from the slaves as to how much signal strength they receive, power consumption and battery levels of the slaves and the master, etc.

Next, the process changes (at 1620) (e.g., by using the master's processor and baseband) system configuration in response to the monitored system performance. The process in some embodiments addresses slaves independently and turns some slaves on while turning other slaves off in order to improve performance. The process in some embodiments changes the mode of the channel between the master and the slaves (e.g. changes single frequency channel to MIMO, or vice versa, changes the MIMO coding of slaves, change the state of the beam-forming between the master and the slaves (on to off, or vice versa), etc.). The process then proceeds to 1610 and the process of monitoring system performance and changing system configuration continues until the communication session ends. In some embodiments, system configuration also includes parameters between the slaves and the external device such as beam-forming between the slaves and the external device to be turned on or off.

D. Gaming Application

Some embodiments are applicable to specific applications that require sensing data measurements. One such application is gaming. Video game consoles from various companies (Sony®, Microsoft™, Nintendo®) have a game console and one or more remotes. The remotes for these products typically use infrared technology and/or short-range wireless technologies such as Bluetooth® to communicate with the game console. Some remotes (e.g. Nintendo® V) also use gyroscopes to sense motion and acceleration. However, these remotes do not provide accurate position information. One application for some embodiments of the invention is to provide accurate sensing information of a gaming remote to the game console in order to provide a richer gaming experience. The sensing information can include parameters such as position tracking, relative movement, and acceleration.

Figure 17:
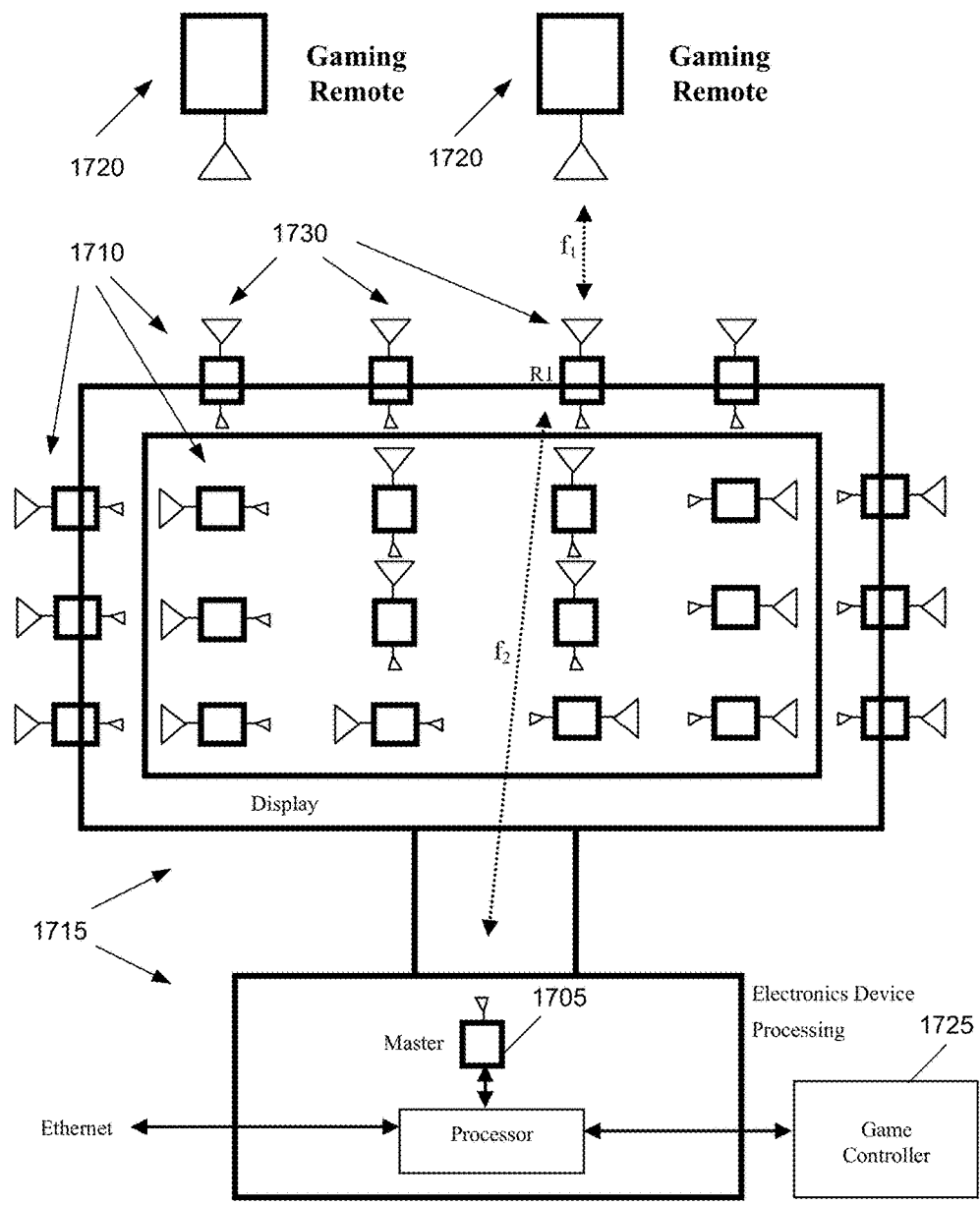
FIG. 17 conceptually illustrates an implementation for a gaming application in some embodiments of the invention.

FIG. 17 conceptually illustrates an implementation for a gaming application in some embodiments of the invention. In this gaming application, the external device 1720 is a video gaming remote, and the masters 1705 (only one is shown for simplicity) and the slaves 1710 are mounted on a consumer electronics device 1715 with a display such as a TV or a PC monitor. The game controller 1725 is connected to the electronics device 1715. In some embodiments, the game controller 1725 is integrated into the electronics device with the display. In yet other embodiments, the game controller 1725 is connected to or its functionality resides on a server or cloud computing set-up on the Internet.

If the frequency $f_1$ is also a high frequency (i.e., in the same range as $f_2$ but possibly a different frequency, e.g. $f_2$ is 60 GHz and $f_1$ is 50 Ghz or 100 GHz), then the external communication antennas 1730 of the slave 1710 that communicate with the gaming remote 1720 are small, and hence a large matrix of slaves 1710 can be mounted on the display. The slaves can be mounted behind the display in a matrix or some irregular pattern and their external antennas can point in a uniform direction or different directions. The slaves in some embodiments have dedicated radios for wireless standards such as cellular (second generation (2G), third generation (3G), fourth generation (4G), etc.), Bluetooth®, Worldwide Interoperability for Microwave Access (Wi-MAX), HD Radio™ and Ultra-wideband standards. Some of the slaves can also be combo radios, where the radios support different frequencies and standards.

When the gaming remote 1720 points to the screen, the antennas of the slaves with the strongest signal track the location that the gaming remote is pointing to and give tracking information to the master which gives it to the gaming controller. In some embodiments the remote 1720 is small enough that it is wearable on human fingers. The remote in some embodiments also operates with wireless power or has small batteries that are rechargeable (e.g., with wireless power). In multi-player gaming applications there can be more than one remote 1720. In some embodiments, there are more than one master (as shown in FIGS. 14 and 15).

The processing of the information is also distributed between the slaves, the master (or masters if there are more than one) and the gaming controller. Some of the processing is done at the slave. For example, consider the case where two game users are using two remotes which employ different $f_1$ frequencies to communicate with the slaves. When the users point their remotes to the same slave, the slave can adapt its filtering to communicate with one remote, or the other, or both. The master also does its own processing such as relative range calculations, location of each remote, and passes that information to the game controller. The game controller then does high-level game decisions.

E. Other Applicable Standards

The 60 GHz wireless standard is one example of using higher frequencies for implementing this invention. There are several standards bodies that are using high frequencies such as 60 GHz. These include WirelessHD, WiGig, and WiFi IEEE 802.11ad. In the U.S. the 60 GHz spectrum band can be used for unlicensed short range data links (1.7 km) with data throughputs up to 2.5 Gbits/s. Higher frequencies such as the 60 GHz spectrum experience strong free space attenuation. The smaller wavelength of such high frequencies also enables the use of small high gain antennas with small beam widths. The combination of high attenuation and high directive antenna beams provides better frequency reuse so that the spectrum can be used more efficiently for point-to-multipoint communications. For example, a larger number of directive antennas and users can be present in a given area without interfering with one another, compared to less directive antennas at lower frequencies. Small beam width directive antennas also confine the electromagnetic waves to a smaller space and therefore limit human exposure. The higher frequencies also provide more bandwidth and allow more information to be wirelessly transmitted. Thus, the same antenna can be used for power generation and communication.

III. Electronic System

Figure 18:
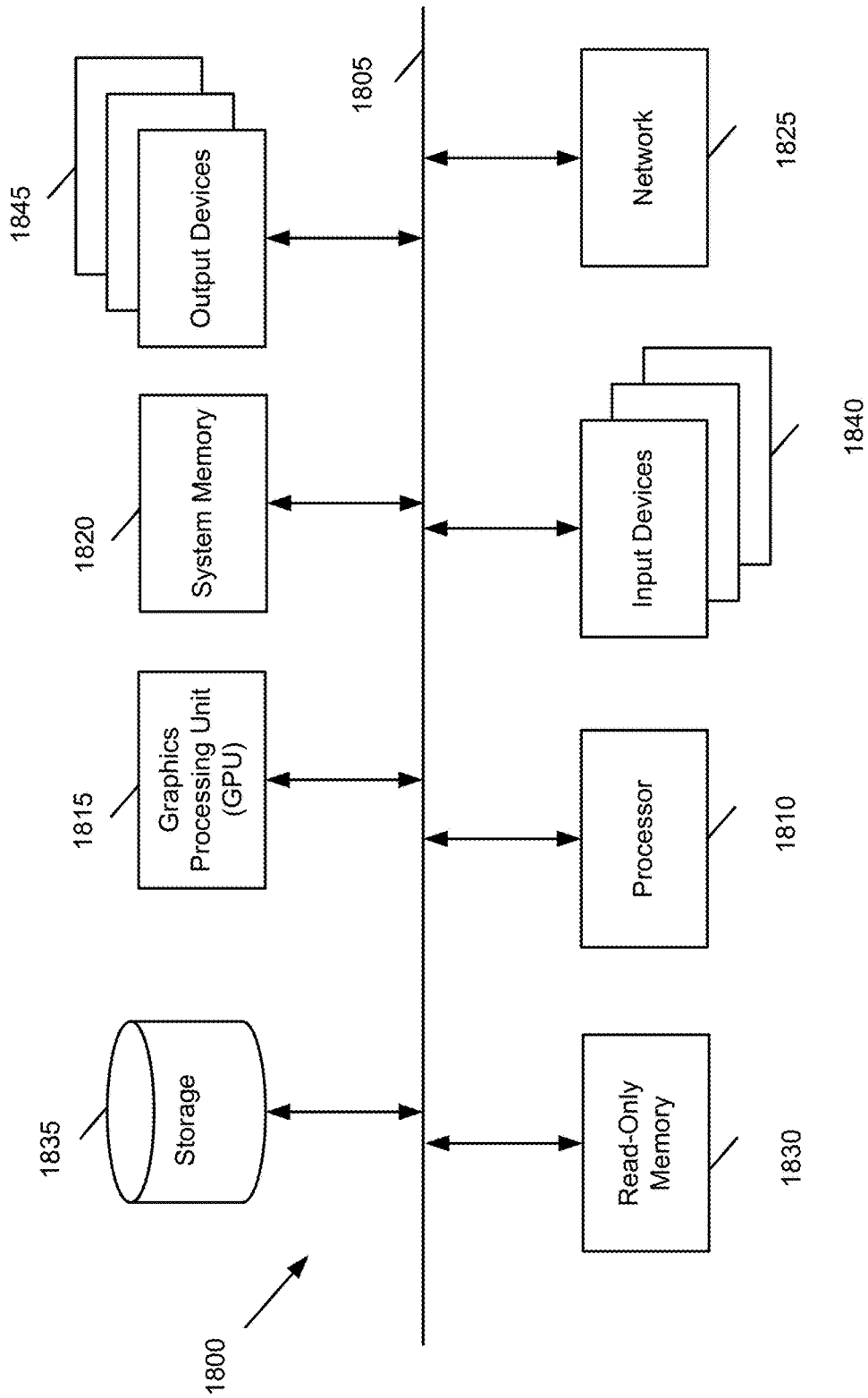
FIG. 18 conceptually illustrates an electronic system with which some embodiments of the invention are implemented.

FIG. 18 conceptually illustrates an electronic system 1800 with which some embodiments of the invention are implemented. The electronic system 1800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1800 in some embodiments includes a bus 1805, processing unit(s) 1810, a graphics processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the GPU 1815, the system memory 1820, and the permanent storage device 1835.

From these various memory units, the processing unit(s) 1810 retrieves instructions to execute and data to process in order to execute the processes of the invention. The processing unit(s) may be a single processor or a multi-core processor in different embodiments. Some instructions are passed to and executed by the GPU 1815. The GPU 1815 can offload various computations or complement the image processing provided by the processing unit(s) 1810. In some embodiments, such functionality can be provided using CoreImage's kernel shading language.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash memory device, etc., and its corresponding disk drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor needs at runtime. In some embodiments, the invention's processes are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (e.g., FIG. 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A communication device, comprising:
   a plurality of master components comprising a first master component comprising a processing unit; and
   a set of slave components:
   each slave component comprising a plurality of antennas for wirelessly communicating with an external device using a first carrier frequency; and each slave component connected to the first master component by a wire line and communicating with the first master component through the wire line, wherein the processing unit of the first master component is configured to:
- select a plurality of slave components from the set of slave components to communicate a plurality of data streams, using the first carrier frequency, with the external device, each of the plurality of data streams comprising a same content;
- perform beamforming for the plurality of slave components to maximize a power of a signal received at the external device from the plurality of antennas of the plurality of slave components; and
- select one or more master components from the plurality of master components to directly communicate with the first master component.

2. The communication device of claim 1, wherein the processing unit is one of a digital signal processor (DSP) and a processor.

3. The communication device of claim 1, wherein the first master component selects the plurality of slave components based on a set of criteria comprising one of power consumption of the first master component, power consumption of one or more slave components, optimal bit error rate of signals exchanged between one or more slave components and the external device, signal to noise ratio of signals exchanged between one or more slave components and the external device, and Electronic Vector Magnitude (EVM).

4. The communication device of claim 1, wherein the processing unit of the first master component is further configured to:
- monitor a performance of the communication of the data streams; and
- change a number of the selected slave components to communicate to the data stream with the external device.

5. The communication device of claim 1, wherein the plurality of the slave components is a first plurality of the slave components from the set of slave components, wherein the processing unit of the first master component is further configured to:
- monitor a performance of the communication of the data streams; and
- select a second, different plurality of slave components from the set of slave components to communicate the data streams with the external device.

6. The communication device of claim 1, wherein the first master component is configured to perform multiple input multiple output (MIMO) coding on the data stream.

7. The communication device of claim 1, wherein the processing unit of the first master component performs beamforming by changing one or more of (i) radio frequency (RF) delays, (ii) phase, and (iii) amplitude of the signals transmitted by the slave components to the external device.

8. The communication device of claim 1, wherein the first master component communicates with a first slave component from the plurality of slave components using a first communication standard, wherein the first master component communicates with a second slave component from the plurality of slave components using a second communication standard.

9. The communication device of claim 1, wherein the first master component communicates with each slave component using a second carrier frequency, the second carrier frequency different than the first carrier frequency.

10. The communication device of claim 1, wherein the first master component communicates with each slave component using said first carrier frequency.

11. A method of communication using a communication device comprising (i) a plurality of master components comprising a first master component comprising a processing unit, and (ii) a set of slave components, each slave component connected to the first master component by a wire line, the method comprising:
- by the processing unit of the first master component, selecting a plurality of slave components from the set of slave components to communicate a plurality of data streams using a first carrier frequency with an external device, each slave component in the plurality of slave components comprising a plurality of antennas for wirelessly communicating with the external device using the first carrier frequency, each of the plurality of data streams comprising a same content;
- by the processing unit of the master component, performing beamforming for the plurality of slave components to maximize a power of a signal received at the external device from the plurality of antennas of the plurality of slave components; and
- by the processing unit of the first master component, selecting one or more master components from the plurality of master components to directly communicate with the first master component.

12. The method of claim 11, wherein the processing unit is one of a digital signal processor (DSP) and a processor.

13. The method of claim 11, wherein the first master component selects the plurality of slave components based on a set of criteria comprising one of power consumption of the first master component, power consumption of one or more slave components, optimal bit error rate of signals exchanged between one or more slave components and the external device, signal to noise ratio of signals exchanged between one or more slave components and the external device, and Electronic Vector Magnitude (EVM).

14. The method of claim 11 further comprising:
- by the processing unit of the first master component, monitoring a performance of the communication of the data stream; and
- by the processing unit of the first master component, changing a number of the selected slave components to communicate the data streams with the external device.

15. The method of claim 11, wherein the plurality of the slave components is a first plurality of the slave components from the set of slave components, the method further comprising:
- by the processing unit of the first master component, monitoring a performance of the communication of the data streams; and
- by the processing unit of the master component, selecting a second, different plurality of slave components from the set of slave components to communicate the data stream with the external device.

16. The method of claim 11 further comprising performing multiple input multiple output (MIMO) coding on the data stream by the first master component.

17. The method of claim 11, wherein the processing unit of the first master component performs beamforming by changing one or more of (i) radio frequency (RF) delays, (ii) phase, and (iii) amplitude of the signals transmitted by the slave components to the external device.

18. The method of claim 11, wherein the first master component communicates with a first slave component from the plurality of slave components using a first communication standard, wherein the master component communicates with a second slave component from the plurality of slave components using a second communication standard.

19. The method of claim 11, wherein the first master component communicates with each slave component using a second carrier frequency, the second carrier frequency different than the first carrier frequency.

20. The method claim 11, wherein the first master component communicates with each slave component using said first carrier frequency.

* * * * *